US010364948B2

(12) United States Patent
Lim et al.

(10) Patent No.: US 10,364,948 B2
(45) Date of Patent: Jul. 30, 2019

(54) OPTICAL WAVEGUIDES AND LUMINAIRES HAVING A WAVEGUIDE WITH EXTRACTION FEATURES AND REFLECTIVE MATERIAL HAVING OPENINGS DISPOSED THEREON

(71) Applicant: CREE, INC., Durham, NC (US)

(72) Inventors: Jin Hong Lim, Morrisville, NC (US); Kurt S. Wilcox, Libertyville, IL (US); Boris Karpichev, Libertyville, IL (US)

(73) Assignee: IDEAL INDUSTRIES LIGHTING LLC, Sycamore, IL (US)

( * ) Notice: Subject to any disclaimer, the term of this patent is extended or adjusted under 35 U.S.C. 154(b) by 0 days.

(21) Appl. No.: 15/976,602

(22) Filed: May 10, 2018

(65) Prior Publication Data
US 2018/0328553 A1    Nov. 15, 2018

Related U.S. Application Data

(60) Provisional application No. 62/504,533, filed on May 10, 2017.

(51) Int. Cl.
*F21S 4/28* (2016.01)
*F21V 8/00* (2006.01)

(52) U.S. Cl.
CPC ............ *F21S 4/28* (2016.01); *G02B 6/002* (2013.01); *G02B 6/0038* (2013.01); *G02B 6/0048* (2013.01); *G02B 6/0051* (2013.01); *G02B 6/0055* (2013.01); *G02B 6/0063* (2013.01); *G02B 6/0073* (2013.01)

(58) Field of Classification Search
CPC ....... F21S 4/28; G02B 6/0063; G02B 6/0073; G02B 6/0055; G02B 6/0013; G02B 6/0016; G02B 6/0018; G02B 6/002; G02B 6/0028; G02B 6/0033; G02B 6/0048; G02B 6/005; G02B 6/0068; G02B 6/0043; G02B 6/0021; F21V 13/04; F21V 7/0008; F21V 7/0091; F21Y 2115/10
See application file for complete search history.

(56) References Cited

U.S. PATENT DOCUMENTS

| 3,532,871 | A  | * | 10/1970 | Shipman ................ B60Q 1/30 359/528 |
| 7,909,496 | B2 | * | 3/2011  | Matheson ............ G02B 6/0021 362/308 |
| 8,123,385 | B2 | * | 2/2012  | Ohkawa ............... G02B 6/0016 362/367 |
| 8,616,746 | B2 | * | 12/2013 | Shinohara ............ G02B 6/0018 362/560 |

(Continued)

*Primary Examiner* — Robert J May
(74) *Attorney, Agent, or Firm* — Myers Bigel, P.A.

(57) ABSTRACT

According to an aspect of the present disclosure, a waveguide comprises a waveguide body comprising an optically transmissive material and one or more extraction features disposed on a surface of the waveguide body such that the extraction features comprise a reflective material disposed on a portion of the surface of the waveguide body. Still further, in accordance with this aspect, the waveguide comprises a light source directing light into the waveguide body through a coupling cavity extending along the waveguide body wherein the light travels through the waveguide body and is redirected by the plurality of extraction features.

26 Claims, 23 Drawing Sheets

(56) References Cited

U.S. PATENT DOCUMENTS

| | | | | |
|---|---|---|---|---|
| 2005/0180167 A1* | 8/2005 | Hoelen | ............... | G02B 6/0046 362/613 |
| 2008/0285310 A1* | 11/2008 | Aylward | ............... | G02B 6/001 362/626 |
| 2009/0109705 A1* | 4/2009 | Pakhchyan | .......... | G02B 6/0016 362/626 |
| 2010/0053959 A1* | 3/2010 | Ijzerman | ............... | G02B 6/003 362/235 |
| 2010/0073911 A1* | 3/2010 | Ohkawa | ............... | G02B 6/0016 362/97.1 |
| 2012/0033445 A1* | 2/2012 | Desmet | ............... | G02B 6/0038 362/606 |
| 2013/0128620 A1* | 5/2013 | Kosuge | ............... | G02B 6/0035 362/623 |
| 2013/0307831 A1* | 11/2013 | Robinson | ............. | G02B 6/0068 345/207 |
| 2015/0177439 A1* | 6/2015 | Durkee | ............... | G02B 6/0021 362/555 |
| 2015/0192742 A1* | 7/2015 | Tarsa | ...................... | G02B 6/34 385/36 |
| 2017/0018670 A1* | 1/2017 | Bende | ............... | H01L 31/0516 |

* cited by examiner

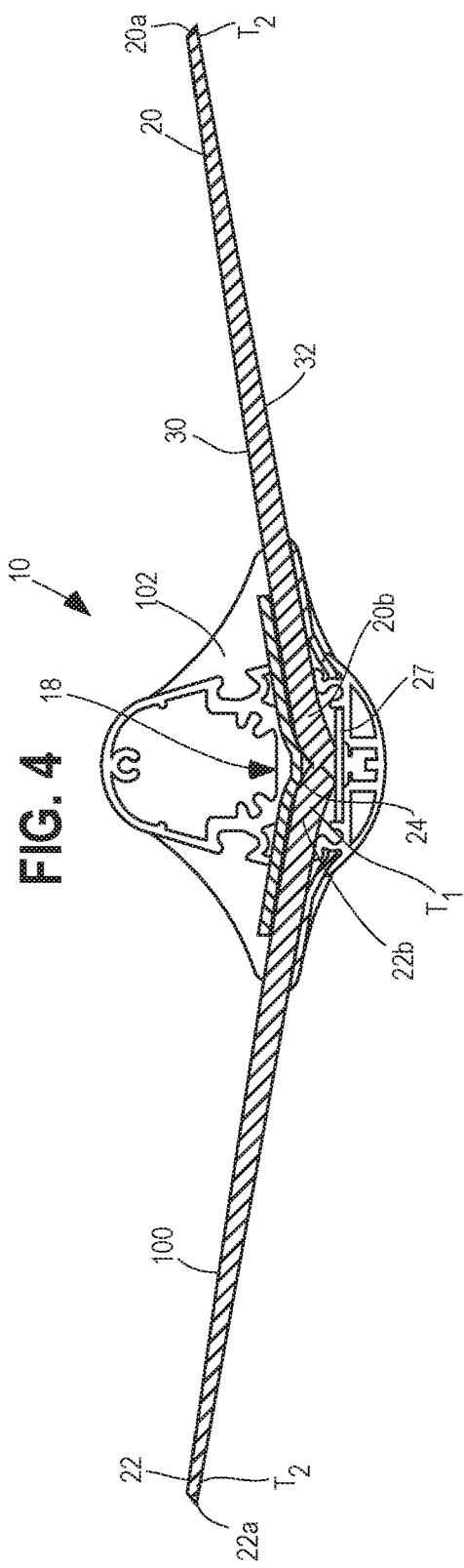
FIG. 4
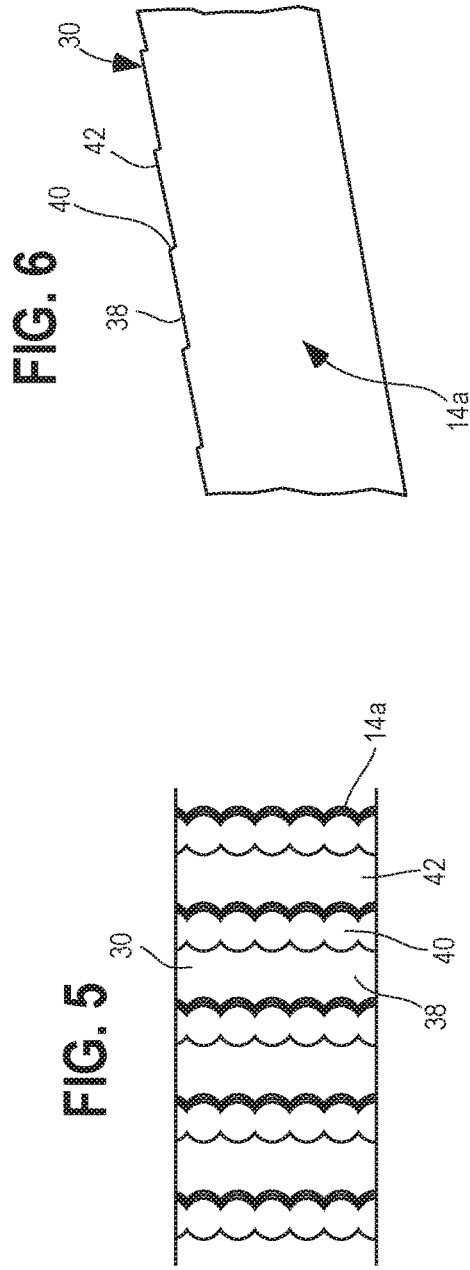
FIG. 6
FIG. 5

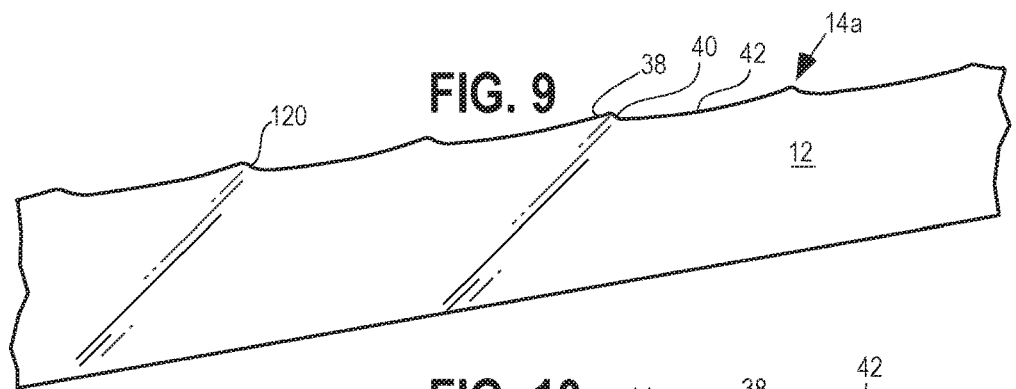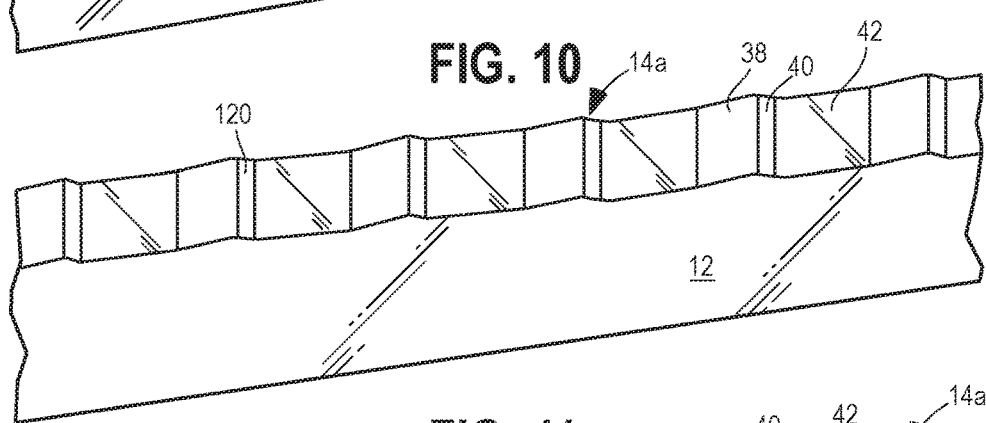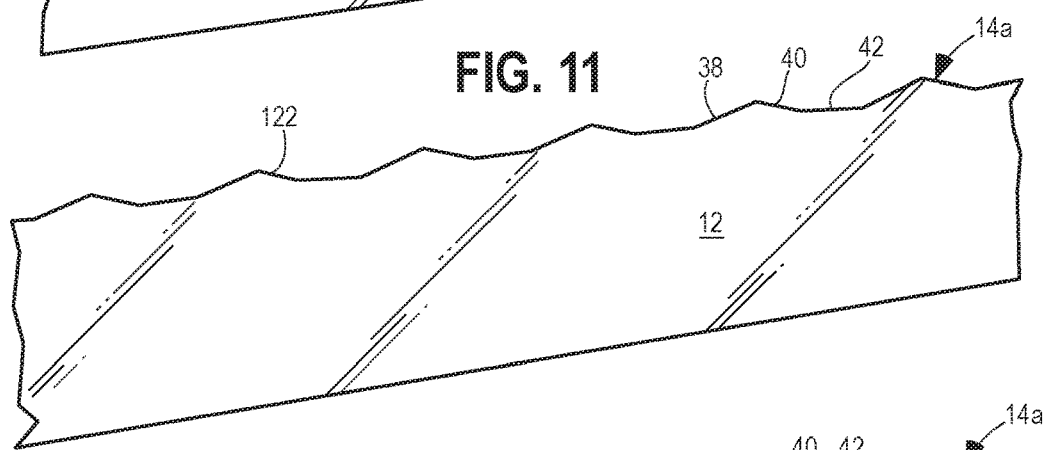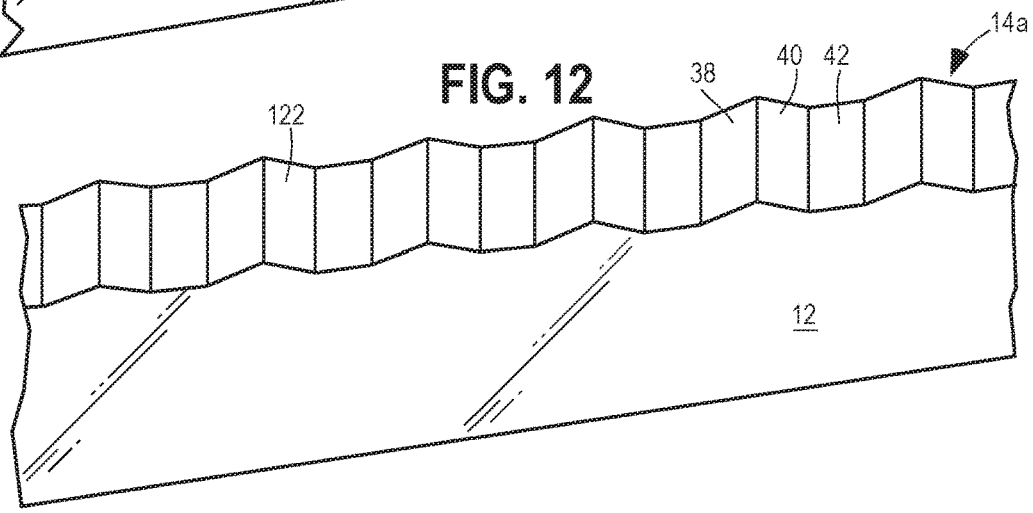

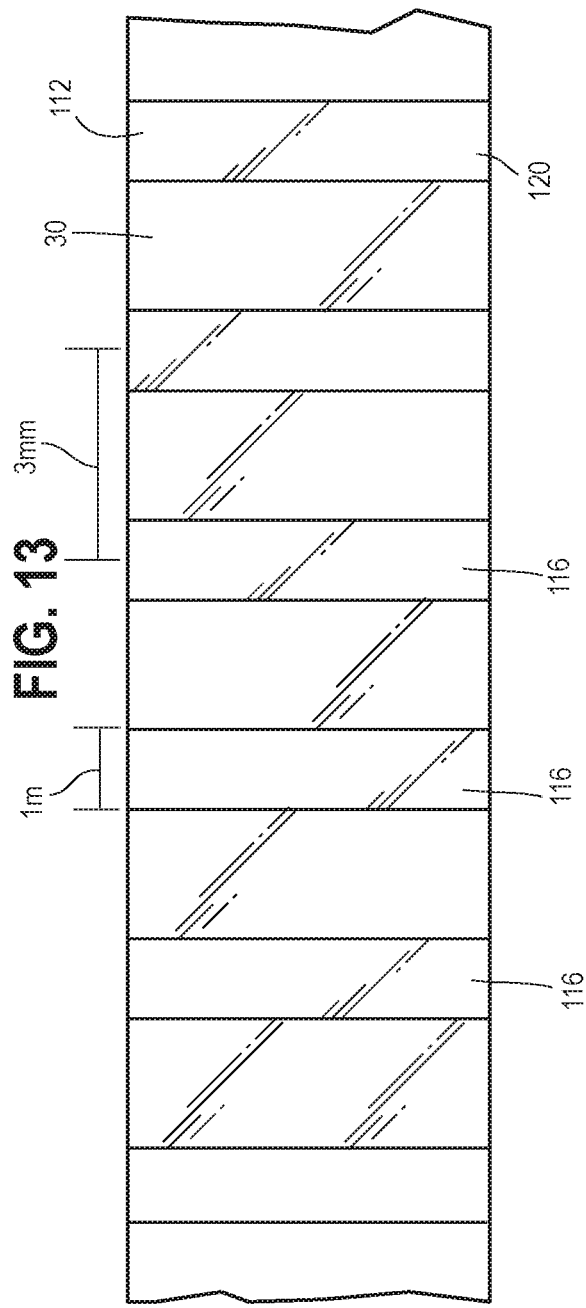

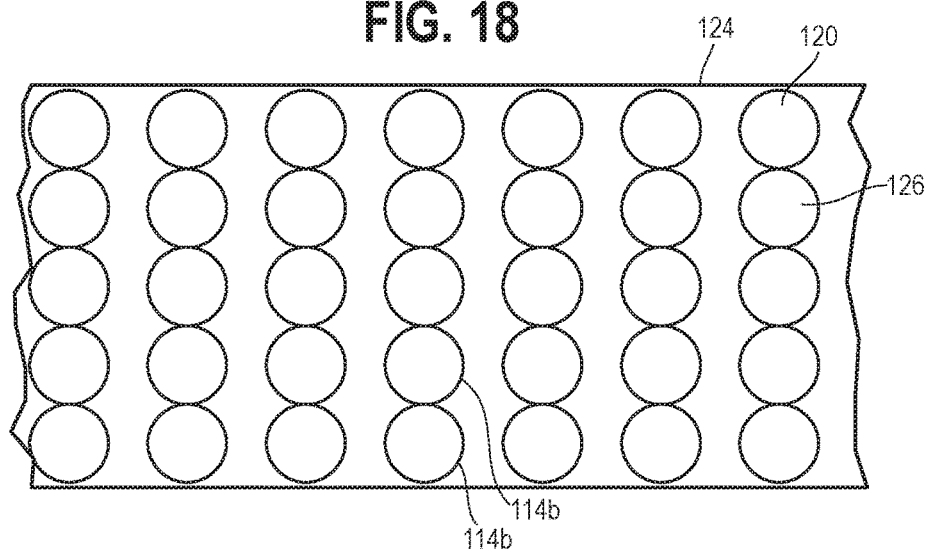
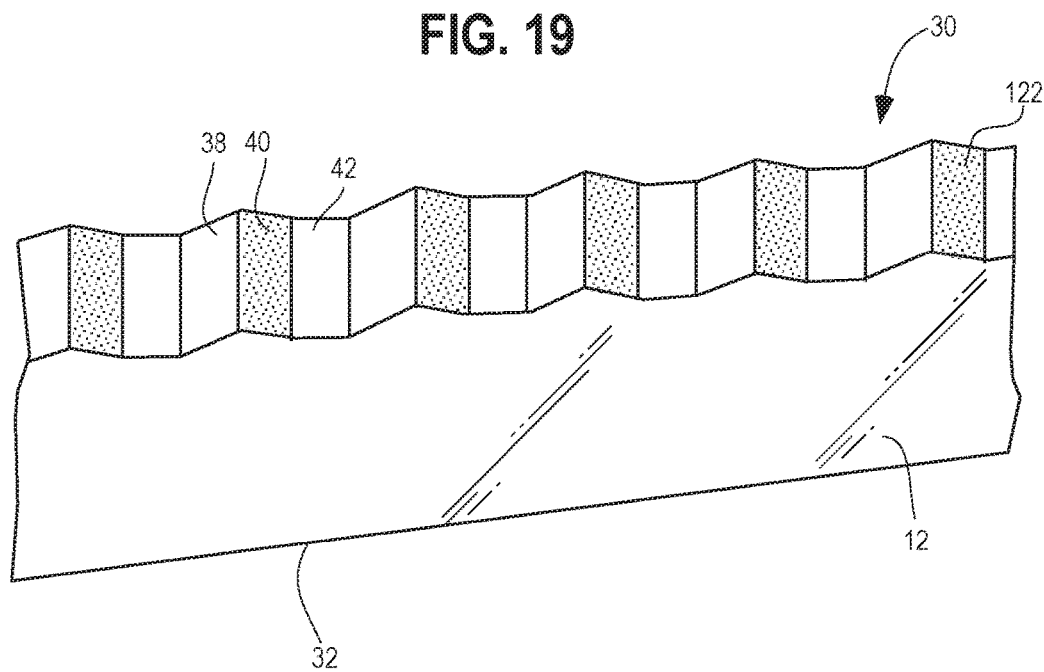

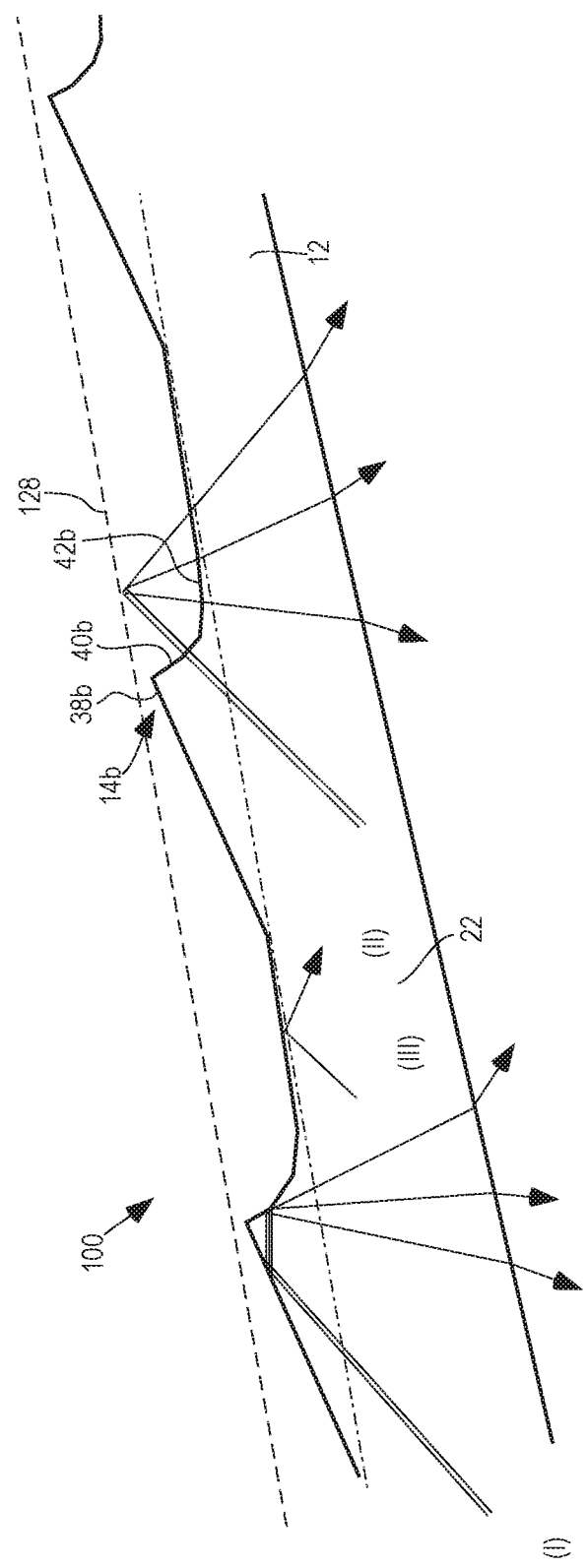

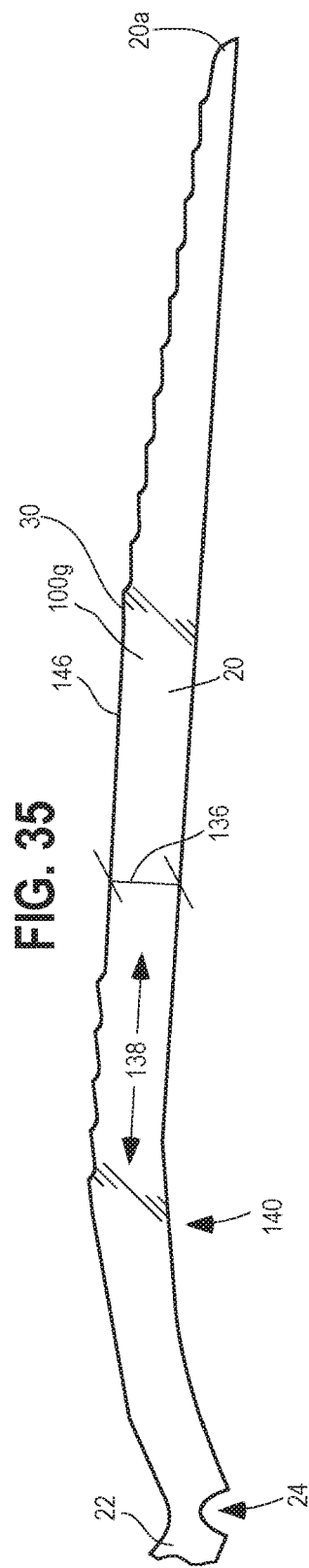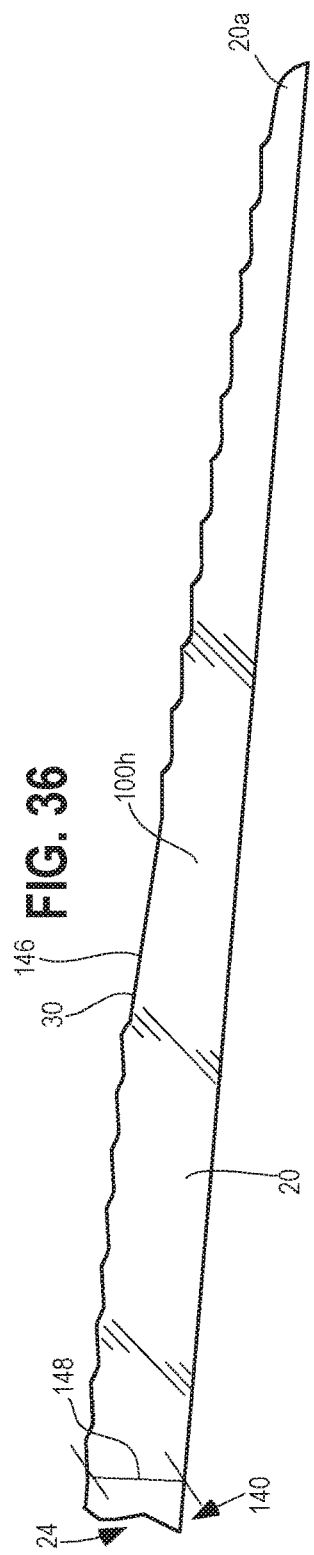

OPTICAL WAVEGUIDES AND LUMINAIRES HAVING A WAVEGUIDE WITH EXTRACTION FEATURES AND REFLECTIVE MATERIAL HAVING OPENINGS DISPOSED THEREON

CROSS REFERENCE TO RELATED APPLICATIONS

The present application claims the benefit of U.S. Provisional Patent Application Ser. No. 62/504,533, filed May 10, 2017, the entire disclosure of which is hereby incorporated by reference herein.

REFERENCE REGARDING FEDERALLY SPONSORED RESEARCH OR DEVELOPMENT

Not applicable

SEQUENTIAL LISTING

Not applicable

FIELD OF DISCLOSURE

The present subject matter relates to general illumination lighting, and more particularly, to optical waveguides and luminaires utilizing optical waveguides for general illumination lighting.

BACKGROUND

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and are dependent on the waveguide geometry and material. The extraction element(s) determine how light is removed by controlling where and in what direction the light exits the waveguide.

When designing coupling component(s), the primary considerations are: maximizing the efficiency of light transfer from the source into the waveguide; controlling the location of light injected into the waveguide; and controlling the angular distribution of the light in the coupling optic. Light may be coupled into the waveguide through an air gap and a coupling cavity defined by surfaces located at an edge and/or interior portions of the waveguide. Such surfaces comprise an interface between the relatively low index of refraction of air and the relatively high index of refraction of the waveguide material. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s).

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Luminaires have recently been developed (e.g., General Electric's ET series panel troffers) that utilize a string of LED components directed into the edge of a waveguiding element (an "edge-lit" approach). However, such luminaires typically suffer from low efficiency due to losses inherent in coupling light emitted from a predominantly Lambertian emitting source such as a LED component into the narrow edge of a waveguide plane.

The description provided in the background section should not be assumed to be prior art merely because it is mentioned in or associated with the background section. The background section may include information that describes one or more aspects of the subject technology.

SUMMARY

According to an aspect contemplated by the present disclosure, a waveguide comprises a waveguide body comprising an optically transmissive material and one or more extraction features disposed on a surface of the waveguide body such that the extraction features comprise a reflective material disposed on a portion of the surface of the waveguide body. Still further, in accordance with this aspect, the waveguide comprises a light source directing light into the waveguide body through a coupling cavity extending along the waveguide body wherein the light travels through the waveguide body and is redirected by the plurality of extraction features.

According to yet another aspect of the present disclosure, a lighting system comprises a waveguide comprising an elongate coupling cavity and at least one light emission surface with a housing disposed about the elongate coupling cavity and arranged to mount a light source within the elongate coupling cavity. This light system further comprises a plurality of extraction features disposed on one or more surfaces of the waveguide and a reflective material disposed over the one or more surfaces of the waveguide such that the plurality of extraction features and the reflective material operate together to develop a light distribution.

In still another aspect contemplated by this disclosure, a waveguide comprises an optically transmissive waveguide body, one or more light sources directing light into the waveguide body through first and second coupling surfaces, and first and second side portions of the waveguide body wherethrough the light is internally reflected extending away from the first and second coupling surfaces. Also, the waveguide comprises first and second pluralities of extraction features disposed on each of the first and second side portions wherein each of the first and second side portions bend towards the respective first and second coupling surfaces at a first point, and further wherein each of the first and second pluralities of extraction features are separated by a second point on each of the first and second side portions that is farther from the respective first and second coupling surfaces than the first point.

Other aspects and advantages will become apparent upon consideration of the following detailed description and the attached drawings wherein like numerals designate like structures throughout the specification.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings:

FIG. 4 is a side elevational view of a luminaire of the present disclosure;

FIG. 5 is an enlarged plan view of extraction features, according to an example embodiment;

FIG. 6 is a side elevational view of the extraction features of FIG. 5;

FIG. 9 is a side elevational view of extraction features, according to an example embodiment;

FIG. 10 is an isometric view from above of the extraction features of FIG. 9;

FIG. 11 is a side elevational view of extraction features, according to an example embodiment;

FIG. 12 is an isometric view from above of the extraction features of FIG. 12;

FIG. 13 is a plan view of a reflective paint pattern for placement on a surface of the waveguide, according to an example embodiment;

FIG. 18 is a plan view if a reflective paint pattern for placement on a surface of the waveguide, according to an example embodiment;

FIG. 19 is an isometric view from above of extraction features, according to an example embodiment;

FIG. 20 is an enlarged ray trace diagram depicting extraction features on a surface of the waveguide, according to an example embodiment;

FIG. 35 is a side elevational view of a portion of a waveguide and extraction features disposed on a surface thereof, according to an example embodiment;

FIG. 36 is a side elevational view of a portion of a waveguide and extraction features disposed on a surface thereof, according to an example embodiment.

Figure 1:
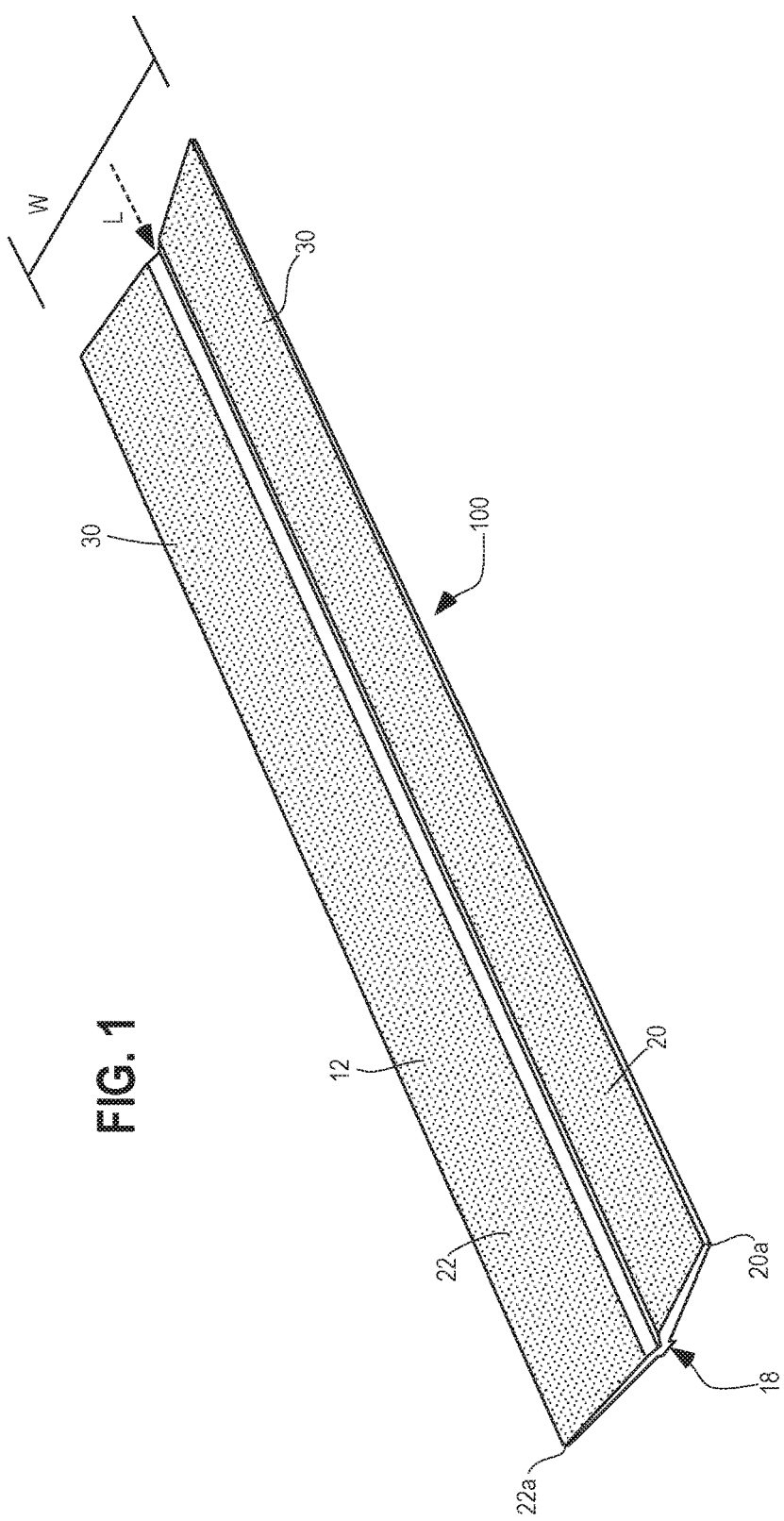
FIG. 1 illustrates a waveguide according to the present disclosure.

In one or more implementations, not all of the depicted components in each figure may be required, and one or more implementations may include additional components not shown in a figure. Variations in the arrangement and type of the components may be made without departing from the scope of the subject disclosure. Additional components, different components, or fewer components may be utilized within the scope of the subject disclosure. Throughout the drawings, identical reference numbers may designate similar, but not necessarily identical, elements. Use herein of a reference numeral without an index number, where such reference numeral is referred to elsewhere with an index number, may be a general reference to the corresponding plural elements, collectively or individually.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Still further, components and processes depicted may be combined, in whole or in part, and/or divided, into one or more different parts, as applicable to fit particular implementations without departing from the scope of the present disclosure. Accordingly, the drawings and description are to be regarded as illustrative in nature and not restrictive.

In general, the curvature and/or other shape of a waveguide body and/or the shape, size, and/or spacing of extraction features determine the particular light extraction distribution. All of these options affect the visual uniformity from one end of the waveguide to another. For example, a waveguide body having smooth surfaces may emit light at curved portions thereof. The sharper the curve is the more light is extracted. The extraction of light along a curve also depends on the thickness of the waveguide body. Light can travel through tight curves of a thin waveguide body without reaching the critical angle, whereas light that travels through a thick waveguide body is more likely to strike the surface at an angle that allows the light to escape. According to well-known total internal reflection ("TIR") principles, the light rays travel through the arm portions until such rays strike an index interface surface at a particular angle less than an angle measured with respect to a line normal to the surface point at which the light rays are incident (or, equivalently, until the light rays exceed an angle measured with respect to a line tangent to the surface point at which the light ray is incident) and the light rays escape.

Tapering a waveguide body causes light to reflect internally along the length of the waveguide body while increasing the angle of incidence. Eventually, this light strikes one side at an angle that allows the light to escape. The opposite example, i.e., a gradually thickening waveguide body over the length thereof, causes light to collimate along the length with fewer and fewer interactions with the waveguide body surfaces. These reactions can be used to extract and control light within the waveguide. When combined with dedicated extraction features, tapering allows one to change the incident angular distribution across an array of features. This, in turn, controls how much, and in what direction light is extracted. Thus, a select combination of curves, tapered surfaces, and extraction features can achieve a desired illumination and appearance. Further still, the angle at which light begins to travel through a waveguide body may be used to increase the likelihood of light exceeding the angle of incidence.

According to one aspect, a waveguide directs light into at least one up to an infinite number of beams or ray groups, wherein the rays of each group travel through the waveguide within a range of angles relative to one another. Each range may be narrow or broad within the TIR limits of the waveguide material.

Waveguide bodies contemplated herein are made of any suitable optically transmissive material, such as an acrylic material, a silicone, a polycarbonate, a glass material, a cyclic olefin copolymer, air, or other suitable material(s), or combinations thereof to achieve a desired effect and/or appearance.

According to another aspect, a waveguide arranges light into a plurality of groups that bounce at least once inside the waveguide by TIR off one or more surfaces of the waveguide. Each group comprises a plurality of light rays that travel at angles that are disposed within a narrow or broad range of angles relative to one another.

In any embodiment, the range may be so narrow that the light rays of ray group(s) may be considered to be fully collimated, or nearly so, or the range may be so broad that the light rays of a ray group may be considered to be anti-collimated, or nearly so. Controlling the ray angles in this manner can lead to increased light control, reduced waveguide size and weight, and reduced luminaire costs.

Figure 2:
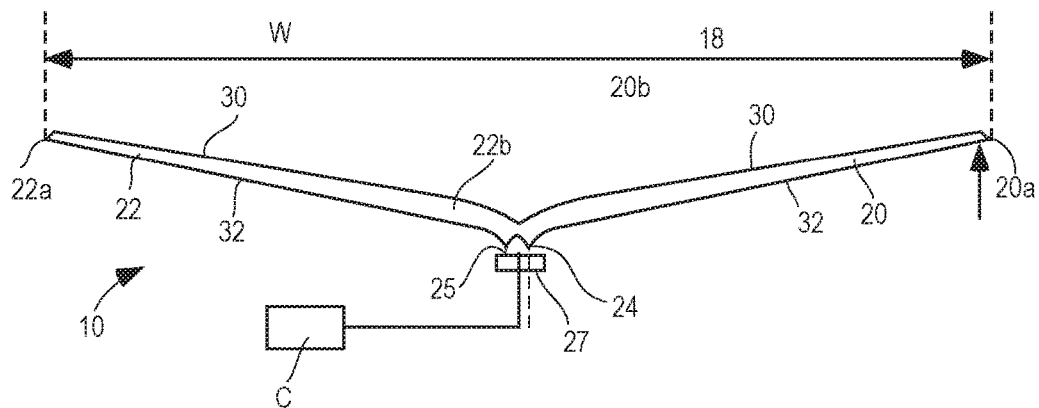
FIG. 2 is a side elevational view of the waveguide of FIG. 2.
Figure 7:
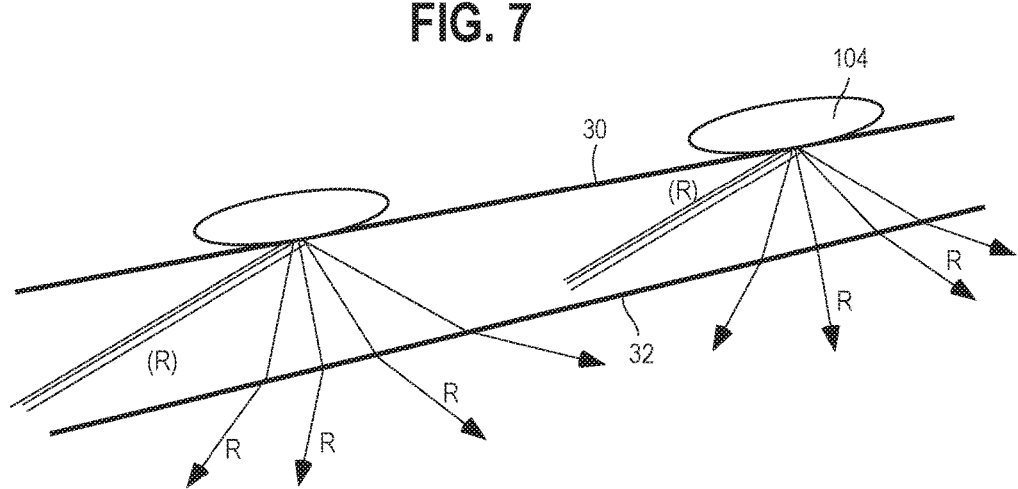
FIG. 7 is an enlarged ray trace diagram depicting reflective paint on a surface of the waveguide, according to an example embodiment.
Figure 31:
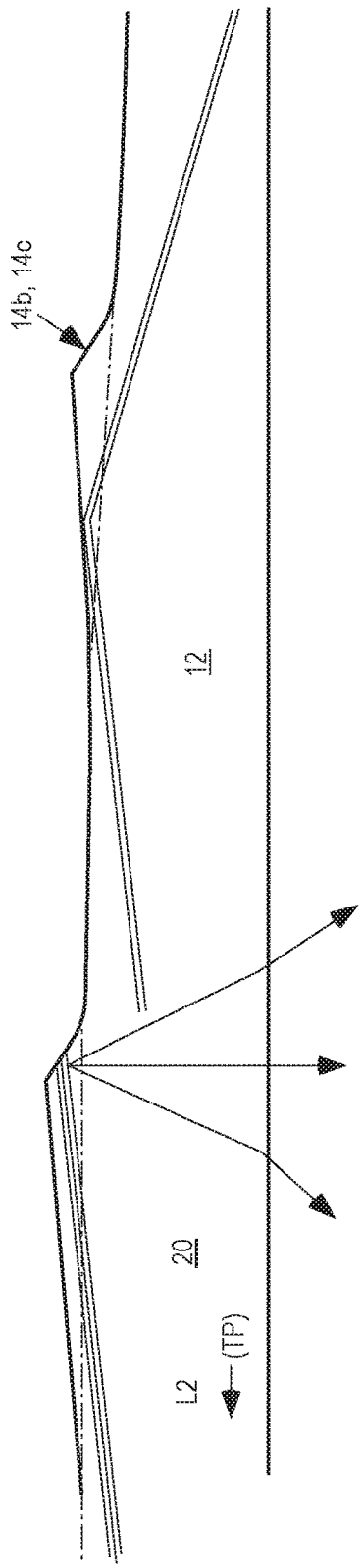
FIG. 31 is an enlarged ray trace diagram depicting extraction features on a surface of the waveguide of FIG. 30.
Figure 32:
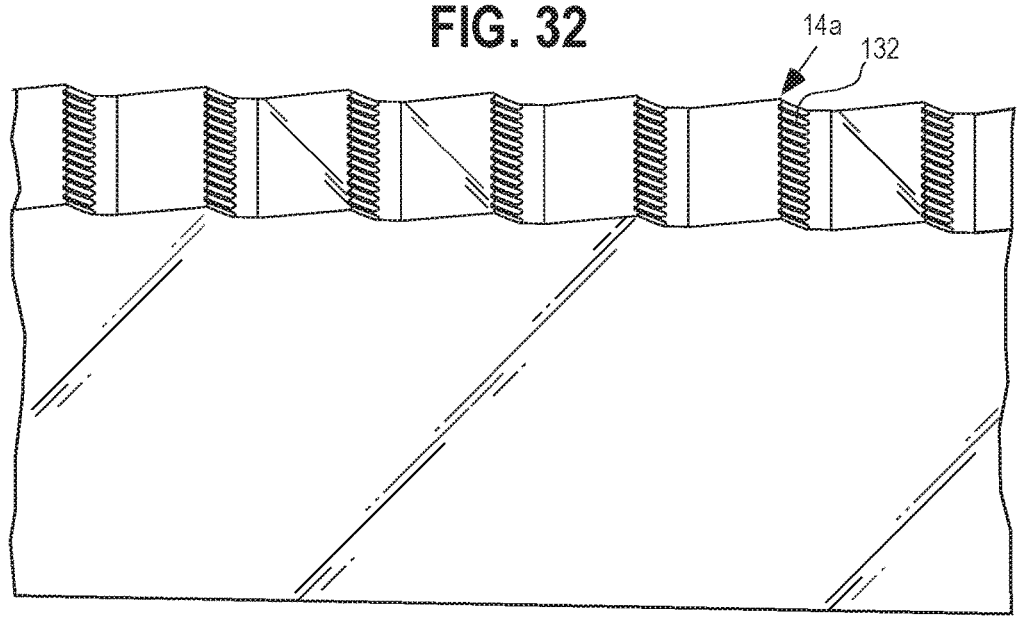
FIG. 32 is an isometric view from above of extraction features, according to an example embodiment.

FIGS. 1-4 show a luminaire 10 comprising a waveguide 100 comprising a waveguide body 12 including a central section 18 and first and second separate side sections 20, 22 extending away from the central section 18 along first and second directions, respectively, and terminating at first and second outer ends 20A, 22A, respectively (FIG. 2). The side sections 20, 22 in the illustrated embodiment may preferably be mirror images of one another. The central section 18 includes a coupling portion/cavity 24, and a light source 25 comprising one or more LED element(s) 26 is disposed adjacent the coupling portion 24, as shown in FIG. 2, and the light source 25 is adapted to produce light that is directed into the waveguide body 12 via the coupling portion 24. A power circuit C (FIG. 2) provides power to the light source 25, and the waveguide body 12 includes a plurality of light extraction features 14a, 14b, 14c (FIGS. 5-21, 25, 27, 31, 33, and 34 show various embodiments of such features 14) that extract light out of the side sections 20, 22, for example as shown in FIGS. 7, 20, and 31.

Figure 2A:
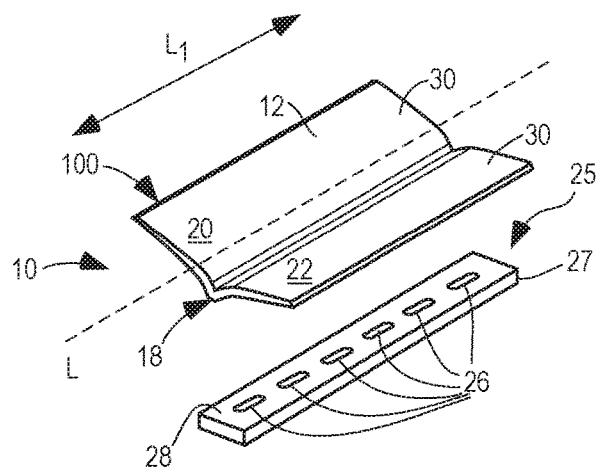
FIG. 2A is an isometric view from above of the waveguide and a light source.

More specifically, as seen in FIG. 2A, the luminaire 10 includes a base element in the form of a substrate 27 having a base surface 28. If desired, the base surface 28 may be covered or coated by a reflective material, which may be a white material or a material that exhibits specular reflective characteristics. The substrate 27 is secured in fixed relation to the waveguide body 12 in any suitable fashion such that the LED elements are preferably equally spaced along a longitudinal axis L (FIG. 2A) and further extend into a cavity 29 (FIG. 3) of the coupling portion 24. Each LED element 26 may be a single white LED or multiple white LEDs or each may comprise multiple LEDs either mounted separately or together on a single substrate or package including a phosphor-coated LED either alone or in combination with a color LED, such as a green LED, etc. In those cases where a soft white illumination is to be produced, each LED element 26 typically includes one or more blue shifted yellow LEDs and one or more red LEDs. Different color temperatures and appearances may be produced using other LED combinations, as is known in the art. In one embodiment, the light source comprises any LED, for example, an MT-G LED module incorporating TrueWhite® LED technology or as disclosed in U.S. Pat. No. 9,818,919, filed Oct. 10, 2012, entitled "LED Package with Multiple Element Light Source and Encapsulant Having Planar Surfaces" by Lowes et al., the disclosure of which is hereby incorporated by reference herein, both as developed by Cree, Inc., the assignee of the present application. In any of the embodiments disclosed herein the LED(s) have a particular emission distribution, as necessary or desirable. For example, a side emitting LED disclosed in U.S. Pat. No. 8,541,795, the disclosure of which is incorporated by reference herein, may be utilized inside the waveguide body 12. More generally, any Lambertian, symmetric, wide angle, preferential-sided, or asymmetric beam pattern LED(s) may be used as the light source. Still further, any of the LED arrangements and optical elements disclosed in co-pending U.S. Pat. No. 9,869,432, filed Dec. 9, 2013, entitled "Luminaires Using Waveguide Bodies and Optical Elements" by Keller et al., which is hereby incorporated by reference herein, may be used.

The power circuit C may be disposed on the substrate 27 or may be located remotely, or a portion of the power circuit C may be disposed on the substrate and the remainder of the power circuit C may be remotely located. In any event, the power circuit C is designed to operate the light source 25 with AC or DC power in a desired fashion to produce light of a desired intensity and appearance. If necessary or desirable, a heat exchanger (not shown) is arranged to dissipate heat and eliminate thermal crosstalk between the LEDs and the power circuit C. Preferably, the light source 25 develops light appropriate for general illumination purposes including light that may be generated in a down light, a light that produces a wall washing effect, a task light, a troffer, or the like. The power circuit C may include a buck regulator, a boost regulator, a buck-boost regulator, a SEPIC power supply, or the like, and is used in any of the embodiments disclosed herein and may comprise a driver circuit as disclosed in U.S. Pat. No. 9,791,110, issued on Oct. 17, 2017, entitled "High Efficiency Driver Circuit with Fast Response" by Hu et al. or U.S. Pat. No. 9,303,823, issued on Apr. 5, 2016, entitled "SEPIC Driver Circuit with Low Input Current Ripple" by Hu et al., both of which are hereby incorporated by reference herein. The circuit C may further be used with light control circuitry that controls color temperature of any of the embodiments disclosed herein in accordance with user input such as disclosed in U.S. patent application Ser. No. 14/292,286, filed May 30, 2014, entitled "Lighting Fixture Providing Variable CCT" by Pope et al., which is hereby incorporated by reference herein.

In the embodiment of FIGS. 1-4 each of the first and the second side sections 20, 22 has an upper and a lower surface 30, 32 and includes a first end 20b, 22b proximal to the coupling portion 24 and a second end 20A, 22A, respectively, distal to the coupling portion 24. The first end 20b, 22b has a first thickness $T_1$, the second end 20A, 22A has a second thickness $T_2$, and the first thickness $T_1$ is greater than the second thickness $T_2$, and hence, the side sections 20, 22 are tapered. In a particular embodiment, for example, the first thickness $T_1$ is no greater than about 6 millimeters and the second thickness is no less than about 2 millimeters. In an embodiment, a center portion of each of the first and the second side sections 20, 22 also has a thickness equal to the second end 20A, 22A in that, for example, it is no less than about 2 millimeters. It should be noted that the minimum thickness may be limited by structural strength considerations, while maximum thickness may be limited by manufacturing considerations including optimum conditions for light distribution and costs of material volume. In an embodiment, the ratio of the maximum to minimum thickness of the waveguide body is 10:1 or less. In a more particular version of the embodiment, the ratio is about approximately 3:1. In still another embodiment, a flat waveguide body 12 is used in which the first thickness $T_1$ is equal to the second thickness $T_2$.

Also in the illustrated embodiment of FIGS. 1-4, the coupling portion 24 curves upward away from the LED elements 26 toward one or both of the second ends 20A, 22A. The upper surface 30 of the first and second sections 20, 22 may be textured. Each of the plurality of light extraction features 14, examples of which are shown hereinthroughout, may comprise texturing thereon or thereabout. Additionally, as seen in co-pending U.S. Pat. No. 9,690,029, filed Dec. 9, 2013, entitled "Optical Waveguides and Luminaires Incorporating Same" by Keller et al., the extraction features 14 may comprise small indents, protrusions, and/or reflective materials and/or surfaces and a relatively large number of such extraction features may be disposed to the left of the coupling portion 24 and a relatively small number of such extraction features may be disposed to the right of the coupling portion 24. In such an embodiment, as should be evident, more light is extracted from the left side of the waveguide body 12 and relatively less light is extracted from the right side of the waveguide body 12.

Referring again to FIGS. 2 and 2A, in the illustrated embodiment, the waveguide body 12 has a length $L_1$ parallel to the longitudinal axis L, the waveguide body 12 further has a width W transverse to the length $L_1$. The width W can be as little about 3 inches or as wide as manufacturing allows. In one embodiment, the width W is about 12 inches and in another embodiment the width W is about 24 inches. The length $L_1$ can be as little as bout 2 inches or as long as manufacturing allows. In an embodiment, the length $L_1$ is preferably at least about 12 inches, and, more preferably, at least about 48 inches.

Figure 3:
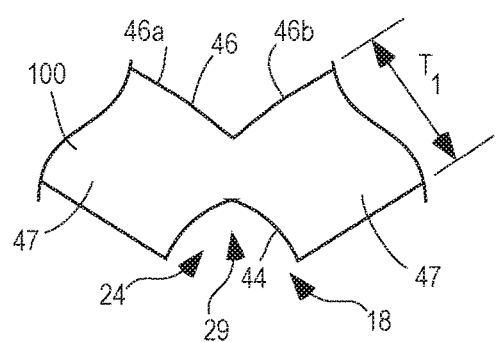
FIG. 3 is an enlarged view of a central portion of an end of the waveguide.

As shown in FIG. 3, the coupling portion 24 has a concave first surface 44 defining the cavity 29 and a curved V-shaped second surface 46 disposed opposite the concave first surface 44. The concave surface 44 may be textured so as to allow for better color mixing of the light. The concave surface 44 may lead light to be coupled into the waveguide 100 smoothly or evenly on the surface, and the curved V-shape surface 46 may encourage the coupled light beam to separate into the two sides 20, 22 of the waveguide 100 in relatively equal quantities by internal or external reflection. In one embodiment, the V-shaped second surface 46 is smooth and uncoated. Also, in an embodiment, an optional layer of specular material may be disposed on the V-shaped second surface 46. Additionally, in embodiments, an optional specular reflective body may be located in the V-shaped convergence between the first and second sides 20, 22. The material or the body may be used in any of the embodiments discussed herein. Furthermore, the sides 47 of the coupling portion 24 can be of any shape including, but not limited to, planar curved, angled, tapered, etc.

While redirecting rays of a light source 26 into one or more ray groups or beams each having a ray angle distribution range typically requires an optic substantially larger than the light source, such redirection can also be accomplished by using a thick waveguide body 12. However, it may be preferable for costs reasons to undertake such light redirection using a relatively thin waveguide body. For example, light developed by the light source 26 can be redirected into two independent sets of light rays. Each set of rays have a very narrow distribution range or may be substantially or fully collimated in order to achieve the desired light distribution out of the waveguide 100. Specifically, the primarily Lambertian distribution of light developed by the LED element(s) 26 is incident on the walls defining the concave surface 44 and may travel through the coupling portion 24 to strike the curved V-shaped second surface 46. The surfaces 46a, 46b that make up the second surface 46 redirect the light by TIR (and/or specular reflection if a reflective material is present) into the sides 20, 22 as sets of ray groups that bounce due to total internal reflection between the upper and lower surfaces 30, 32 until such rays exceed the critical angle of the material of the waveguide body 12 and escape, as seen in FIGS. 7, 20, and 31. Light incident on lower surface spaces of the concave surface 44 travels through the coupling portion 24 directly into the portions 20, 22 without striking the curved V-shaped second surface 46. In the embodiment of FIG. 3 the lower surfaces 44b are curved in a manner that causes the light passing through the surfaces 44b to be redirected/refracted. This light also bounces between the upper and lower surfaces 30, 32 until such rays exceed the critical angle of the material of the waveguide body 12 and escape, as also seen in FIGS. 7, 20, and 31. In some embodiments, the surfaces 46a, 46b may be parabolic in shape and centered on the light source 26. The extraction features 14 cause the light to exit the waveguide 100 in a controlled fashion such that light is directed out of the upper and lower surfaces 30, 32. Because the light rays are at least substantially collimated they experience minimal spreading as they propagate through the waveguide body 12. This results in highly controlled beams which can be either extracted in a collimated fashion, or spread into a wide distribution.

FIG. 4 discloses an example embodiment of the luminaire 10 disposed within a housing 102. The housing 102 may be disposed about the central section 18 and coupling portion 24 of the waveguide body 12. The luminaire 10, and thereby the waveguide body 12, may be suspended and/or mounted by way of the housing 102. Further, the power circuit C (FIG. 2), the substrate 27, and the light source 25 comprising the one or more LED element(s) 26, which may be disposed on the substrate surface 28, may be disposed within the housing 102 proximal the central section 18 of the waveguide body 12. It may be desirable for the luminaire(s) 10, described and shown hereinthroughout, to develop an illumination distribution of generally Lambertian distribution downward, such as towards a floor, and a small batwing-shaped distribution upward, such as towards a ceiling. Other desired light distributions may be realized, some of which are particularly described hereinbelow. It may be desirable for the luminaire(s) 10 to have a lumens ratio of downlight to uplight that is 70/30. In other words, 70% of light lumens extracted are extracted down and away from the luminaire(s) 10 toward the floor (e.g., from a suspended light fixture) and 30% of light lumens are extracted toward the ceiling.

The waveguide(s) 100 shown and described herein enable the luminaire(s) 10 to generate the lumens ratio of 70/30 downlight/uplight and a Lambertian downward distribution. The housing 102 from which embodiments of the waveguide body 12 extend, for example, may be the same or a modified version of a luminaire mounting assembly used by the LN4® suspended LED luminaire or other luminaires of the LN® series manufactured by Cree, Inc. Such example housing embodiments may also use compatible components such as, for example, heatsinks, LEDs, printed circuit board(s) (PCB), and end cap assemblies. Example mounting assemblies and other details of suitable waveguides and luminaires for use with the waveguide(s) 100 contemplated by the present disclosure are provided in U.S. Pat. No. 9,625,636, filed Jan. 8, 2016, entitled "Optical Waveguide Bodies and Luminaires Utilizing Same", U.S. patent application Ser. No. 14/577,730, filed Dec. 19, 2014, entitled "Optical Waveguide Bodies and Luminaires Utilizing Same", U.S. Pat. No. 9,366,799, filed May 30, 2014, entitled "Optical Waveguide Bodies and Luminaires Utilizing Same", and U.S. patent application Ser. No. 15/481,206, filed Apr. 6, 2017, entitled "Optical Waveguide Bodies and Luminaires Utilizing Same", all of which are hereby incorporated by reference herein.

The waveguide(s) 100 described herein comprise additional features to assist in developing the target illumination distribution(s). The embodiments discussed hereinbelow may incorporate reflecting and/or diffusing surface coverings/coatings. The coverings/coatings may take the form of reflecting/diffusing coatings, paints, and/or sprays as applied to metals, plastics, papers, and/or films. Further, the coverings/coatings contemplated herein may take the form of reflecting/diffusing films and/or sheets including paper films, plastic films, paper sheets, plastics sheets, and/or metal sheets. The reflecting/diffusing films, coatings, paints, sheets, and/or sprays may have the same and/or different reflecting and/or diffusing properties. Further, the films, coatings, paints, sheets, and/or sprays contemplated hereinbelow may be applied to provide more or less coverage of the example waveguide(s) 100 described. Still further, the films, coatings, paints, and/or sprays may be applied to particular parts while not being applied to other parts. The films, coatings, paints, sheets, and/or sprays may be applied during or after manufacture of the waveguide(s) 100, and before, during, and/or after the manufacture and/or assembly of the luminaires 10 detailed herein. An example suitable coating/spray/film/sheet/paint may be WhiteOptics® Reflectors Film or WhiteOptics® Advanced Coatings. Another example suitable coating used with embodiments described hereinbelow is Makrolon® 6487 Polycarbonate manufactured by Covestro Plastics. Alternatively, reflecting and/or diffusing coatings/sprays/films/sheets/paints manufactured by other providers may instead be used. The films, coatings, paints, sheets, and/or sprays contemplated by this disclosure are referred to as coatings 104 and films 30, although use of these terms referentially should not limit the materials/substances added to the waveguide 100 to achieve the below described functionality.

In embodiments, each of the plurality of light extraction facets 14a comprises an intermediate surface 40 that extends from a first surface 38 to a second surface 42. All or some of the intermediate surfaces 40 may be planar (see FIGS. 10, 12, 15, 17, and 19) or curved (see FIG. 5). In an embodiment, the angle of curvature of the intermediate surface 40 may range from 10° to 80°. In a more particular version of the embodiment, the angle of curvature is about approximately 30° to 60°. In still another version of the embodiment, the angle of curvature of the intermediate surface 40 is approximately 42.5° to 50°. The intermediate surfaces 40 may, but need not, have a constant radius of curvature. In other embodiments, all or some of the intermediate surfaces 40 may be scalloped as shown in FIG. 5, in combination with the planar or constant radius curvature noted above.

Referring still to FIGS. 5 and 6, also preferably, each first surface 38 is displaced from an associated adjacent second surface 42 by a particular distance wherein the distances therebetween are constant or vary along the length and width of each surface 30. The disposition of the center of the radius of curvature, the magnitude of the radius of curvature, and the arcuate extent of each intermediate surface 40 affect the distribution of light from the waveguide body 12. In another embodiment, as seen in FIGS. 9-12, the intermediate surfaces 40 are planar or curved but not scalloped, and the intermediate surfaces 40 are all parallel to one another, although the surfaces 40 need not all be planar, curved and/or parallel. In an embodiment, the perpendicular distance between the first surface 38 and the adjacent second surface 42 (i.e., the length of a line extending from and normal to the surface 38 to an imaginary projection of the plane 42 below the surface 38) is preferably less than 100 microns, and more preferably between about 20 and about 100 microns. In another embodiment, the intermediate surfaces 40 are parallel to one another and are disposed at non-zero angles with respect to associated first and second surfaces 38, 40. The angle between each intermediate surface 40 and a line tangent to an adjacent associated surface 38 or 42 where the surface 38 or 42 meets the surface 40 may be relatively steep (for example, as seen in FIG. 20) or may be relatively shallow (e.g., as seen in FIGS. 9 and 10). Thus, for instance, the angle between each intermediate surface 40 and a line tangent to an adjacent associated surface 38 where the surface 38 meets the surface 40 may be in a range between about 5 degrees and 90 degrees, and more particularly, may be between about 40 degrees and about 60 degrees, and, most preferably, about 50 degrees. This angle (or any other related angle, such as the angle between the intermediate surface 40 and a line tangent to an adjacent associated surface 42 where the surface 42 meets the surface 40) and the size of each intermediate surface 40 affect the output distribution of light from the waveguide body 12. The overall effects of these surfaces when combined is further discussed hereinbelow with reference to FIGS. 20, 31, 32, and 34. It should also be noted that the extraction features 14 may be of differing size, shape, and/or spacing over the surface(s) of the waveguide body 12 so that an asymmetric emitted light distribution is obtained. In another embodiment, the lower surface 32 is textured. This texturing may be effected by a roughened surface that creates a diffusion effect, and/or by a plurality of extraction features 14. These extraction features 14 may be identical or similar to those described above.

Figure 8:
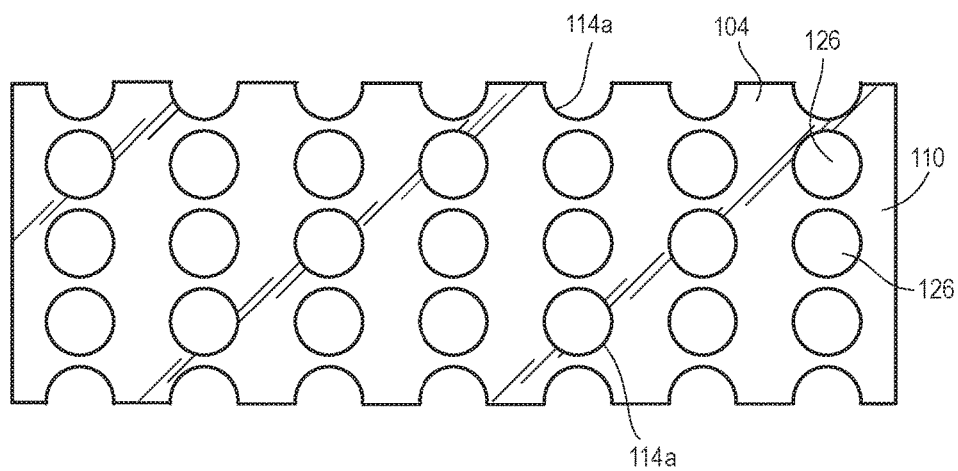
FIG. 8 is a plan view of a reflective paint pattern for placement on a surface of the waveguide, according to an example embodiment.

Referring now to FIG. 7, an example embodiment of the waveguide 100 with the surface coating 104 disposed thereon is illustrated. The example embodiment of the waveguide 100 is shown with light rays (R) passing therethrough. The waveguide 100 has an upper surface 30 and a lower surface 32. The surface coating 104 in this example is an optical paint that covers preferably about 33% of the upper surface 30. An optical paint pattern 110 covering about 33% of the upper waveguide surface 30 is illustrated in FIG. 8. The optical paint pattern 110 comprises arrays of circular zones 126 of the optical paint 120 comprising arcuate boundaries 114a. The circular zones 126 of the optical paint pattern 110 may comprise radii of about 0.5 mm and spacing therebweteen of about 2.0 mm by 1.25 mm. The light rays travelling through the waveguide 100 that strike the waveguide surface 30 without optical paint spots are either internally reflected by TIR back into the waveguide body 12 or pass through the upper waveguide surface 30. Incident light rays that strike the optical paint circular zones 126 are reflected diffusely in the downward direction and out of the lower surface 32 of the waveguide 100.

Another optical paint pattern 112 for painting the upper surface 30 of the waveguide 100 with optical paint 120 is shown in FIG. 13. The optical paint pattern 112 illustrated in FIG. 13 is a series of strips/stripes 116. The strips/stripes of optical paint 116 also may cover preferably about 33% of the upper surface 30 of the waveguide 100. The strips/stripes 116 may be uniformly spaced or the spacing therebetween may be increased or decreased selectively according to the desired lighting distribution, the angle of the first and second sides/wings 20, 22 of the waveguide body 12, a thickness of the waveguide body 12, and/or a taper of the waveguide body 12. In the illustrated example embodiment, the strips/stripes 116 of optical paint 120 may be about 1 mm thick and spaced apart, one from the next, by about 3 mm. The optical paint patterns 110, 112 may be applied to the upper surface 30 of the waveguide 100 and, while omitting extraction facets, may develop a lumens ratio of preferably about 70/30 downlight/uplight. Further, the optical paint patterns 110, 112 also may result in a desirable Lambertian downlight distribution. In simulations of the embodiment of FIGS. 7 and 8, the lumens ratio of downlight/uplight may be about 77.5/22.5. Further, in simulations of embodiments comprising the optical paint pattern 112 (FIG. 13) applied directly to the waveguide surface 30 (without extraction facets), the lumens ratio of downlight/uplight may be about 77/23.

Figure 37:
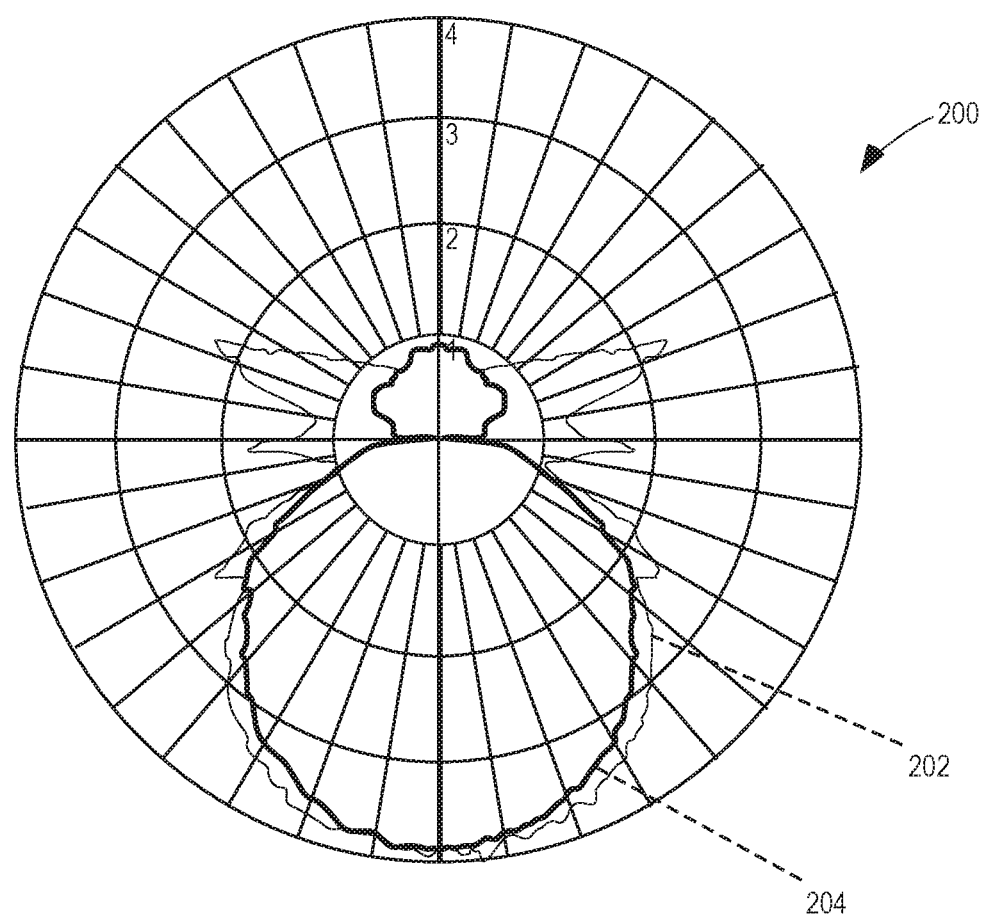
FIGS. 37-39 illustrate intensity distributions that may be produced by the waveguide(s) of the present disclosure, according to example embodiments.

Referring now to FIGS. 9 and 10, the optical paint 120 is combined with embodiments of the extraction facets 14a (FIGS. 5 and 6). The extraction facets 14a (described hereinabove with respect to FIGS. 5 and 6) are shown in cross-section in FIG. 9 with a spacing of preferably about 5.5 mm and an arc length of preferably about 0.57 mm. The optical paint 120 may be disposed on the intermediate surfaces 40, which in this example embodiment are planar surfaces along a width of the waveguide body 12, and planar between surface 38 and surface 42. The intermediate surfaces 40 may fully or partially covered with the optical paint 120. For example, the intermediate surfaces 120 may have disposed thereon one of the optical paint patterns shown in FIGS. 8, 13, and/or 18. Also, the paint may have a different location on the extraction facets 14a, such as on the ridges 38 thereof, and/or a different shape or distribution, such as oval, rectangle, and/or triangle shaped paint. In embodiments with the extraction facets 14a comprising this spacing and with the optical paint 120 disposed thereon, simulations produce a lumens ratio of downlight/uplight of about 68/32 to about 69/31. FIG. 37 depicts an intensity distribution 200 that may be produced by the waveguide 100 with features shown in FIGS. 9 and 10. The intensity distribution 200 illustrates light 202 distributed along the waveguide axis L (FIG. 2A) and light 204 distributed transverse to the axis and along the waveguide width W. The intensity distribution 200 of FIG. 37 comprises a desirable Lambertian downlight distribution.

In FIGS. 11 and 12, the extraction facets 14a comprise a texturing 122 disposed thereon. In example embodiments, the extraction facets comprise spacing of about 4.0 mm and an arc length of about 1.28 mm. For example, the texturing 122 may be MT11020 texturing such as that produced by Mold-Tech®. In example embodiments comprising extraction facets 14a with this spacing, and the texturing 122 disposed thereon, a lumens ratio of downlight/uplight is simulated as about 56/44 with an optical efficiency of about 90%, which may be an increase as compared with use of reflectors.

Figure 14:
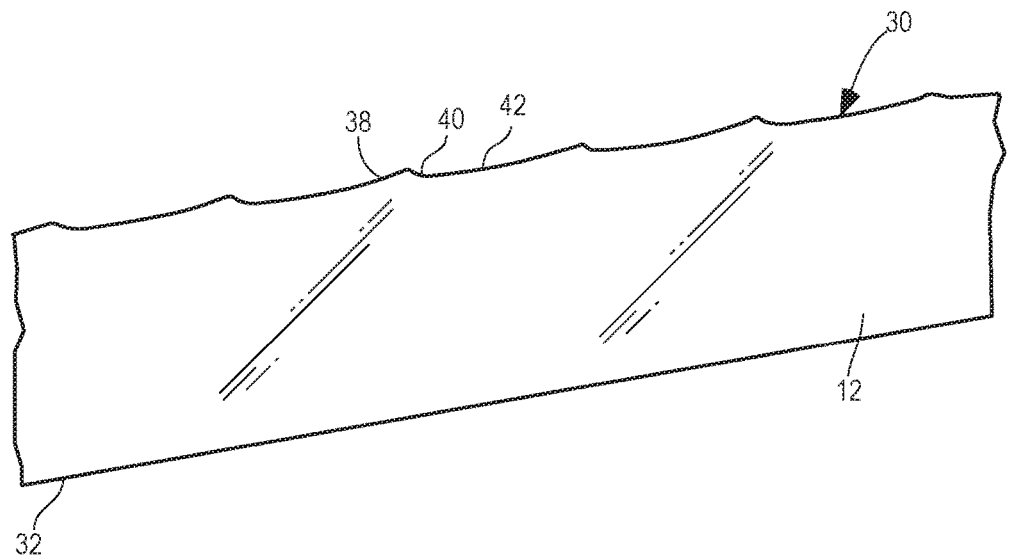
FIG. 14 is a side elevational view of extraction features, according to an example embodiment.
Figure 15:
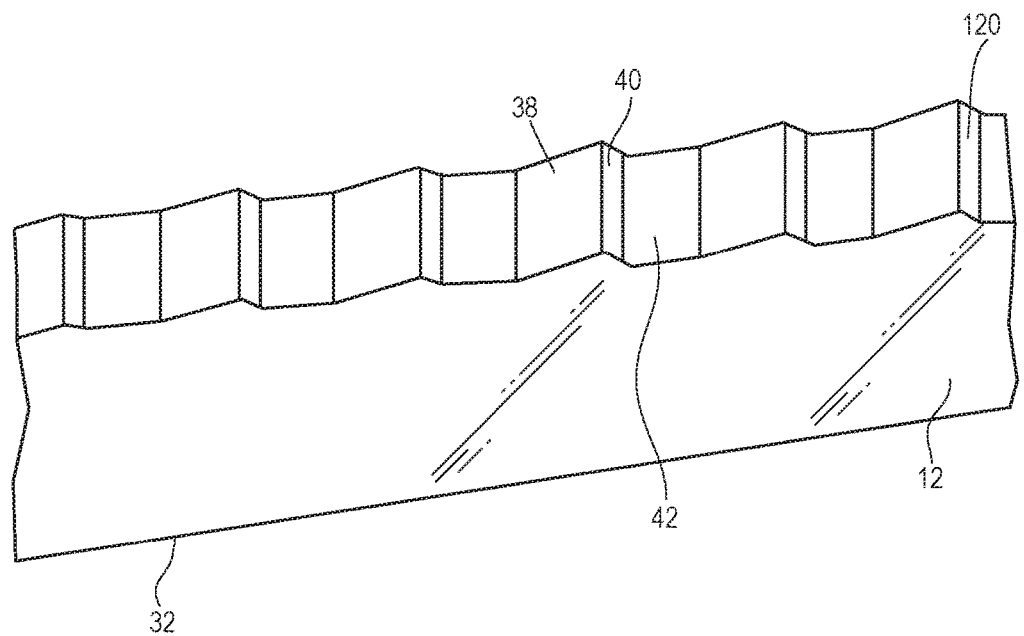
FIG. 15 is an isometric view from above of the extraction features of FIG. 14.

Referring now to FIGS. 14 and 15, the optical paint 120 is combined with embodiments of the extraction facets 14a. The extraction facets 14a are shown in cross-section in FIG. 14 and comprise spacing of preferably about 4.0 mm and an arc length of preferably about 0.59 mm. The optical paint 120 may be disposed on the intermediate surfaces 40, which in this example embodiment are planar surfaces. In embodiments with the extraction facets 14a comprising this spacing and with the optical paint 120 disposed thereon, simulations produce a lumens ratio of downlight/uplight of about 74/26.

Figure 16:
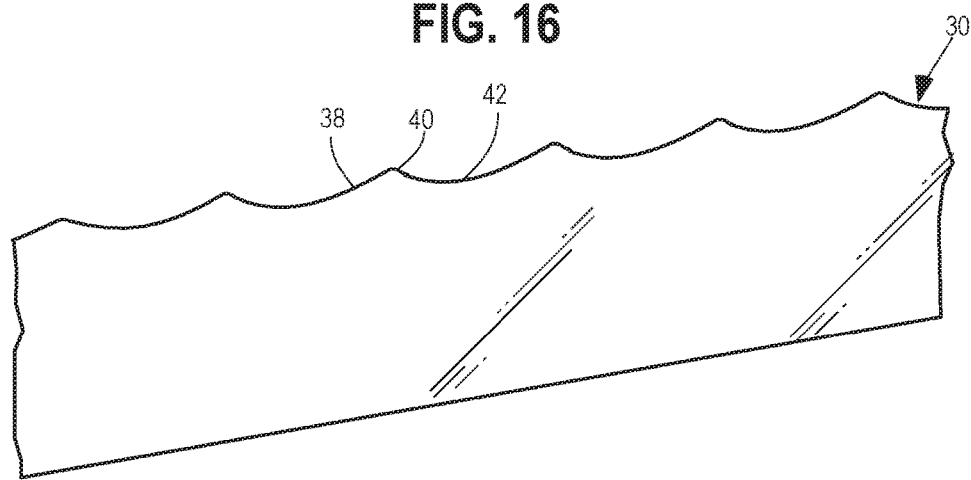
FIG. 16 is a side elevational view of extraction features, according to an example embodiment.
Figure 17:
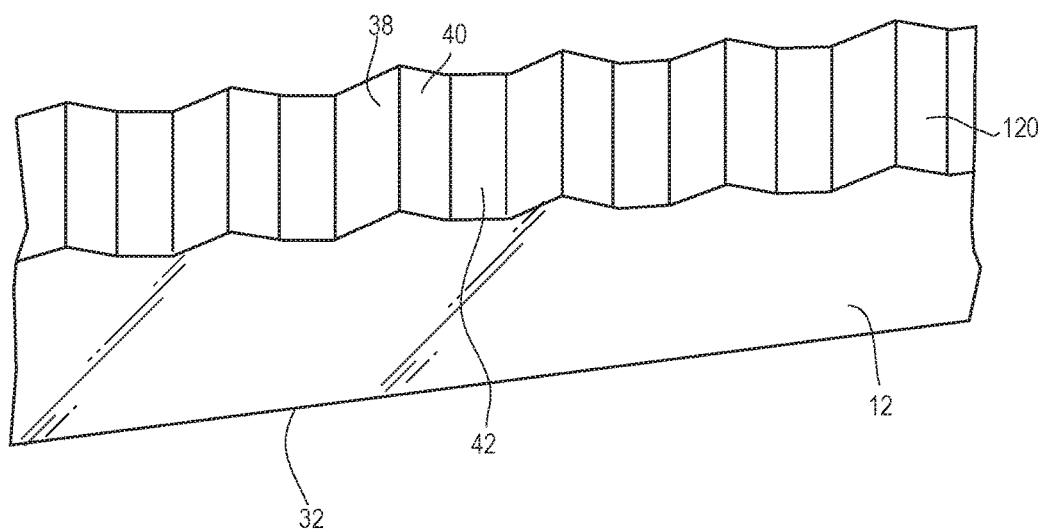
FIG. 17 is an isometric view from above of the extraction features of FIG. 15.

In the example embodiments of FIGS. 16 and 17, the extraction facets 14a comprise another arrangement with spacing of preferably about 4.0 mm between facets and an arc length of preferably about 1.28 mm. The optical paint 120 may be disposed on the intermediate surfaces 40, which again in this example embodiment are planar surfaces. However, the intermediate surfaces 40 of this example are relatively large as compared with those of FIGS. 14 and 15. In embodiments with the extraction facets 14a comprising this spacing and with the optical paint 120 disposed thereon, simulations produce a lumens ratio of downlight/uplight of about 79/21.

An optical paint pattern 124 covering about 70% of the upper waveguide surface 30 is illustrated in FIG. 18. In the optical paint pattern 124, the circular zones 126 of optical paint 120 are arranged such that the circular zones 126 are adjacent and/or overlapping with arcuate boundaries 114b. The circular zones 126 of the optical paint pattern 124 may comprise radii of about 0.5 mm and spacing therebweteen of a relatively lesser extent as compared with the circular zones 126 of FIG. 8. The light rays travelling through the waveguide 100 that strike the waveguide surface 30 not having disposed thereon optical paint circular zones 126 are either internally reflected by TIR back into the waveguide body 12 or pass through the upper waveguide surface 30. Incident light rays that strike the optical paint circular zones 126 are reflected diffusely in the downward direction and out of the lower surface 32 of the waveguide 100. In an example embodiment, omitting extraction facets, and comprising application of the optical paint pattern 124 illustrated in FIG. 18 to the upper surface 30 of the waveguide 100, simulations may render a lumens ratio of about downlight/uplight of 81/19.

In FIG. 19, the extraction facets 14a may comprise the texturing 122 disposed thereon. In this embodiment, the extraction facets 14a comprise spacing of about 4.0 mm and an arc length of about 1.28 mm. For example, the texturing 122 may be MT11070 texturing such as that produced by Mold-Tech®. In example embodiments comprising the extraction facets 14a with this spacing and texturing the lumens ratio of downlight/uplight is simulated as about 73/27 with an optical efficiency of about 85%.

In further example embodiments, the optical paint pattern may comprise circles, squares, ovals, linear band array(s), irregular shapes, and/or a combination of these shapes. Further, in accordance with this example embodiment, optical paint 120 may be painted directly onto waveguides in patterned shapes. The particular patterned shape may be decided by the desired ratio of painted to unpainted area on the upper surface 32 of the waveguide 100 because such ratio of painted to unpainted waveguide surface area impacts the resultant ratio of downlight to uplight. A mask of the patterns may be fabricated according to any suitable method such as chemical masking, stenciling, etc. The masked waveguide may then be sprayed, or otherwise coated, with the optical paint 120 on portions of the sides 20, 22 of the waveguide that are exposed or otherwise prepared to accept the optical paint coating 120.

According to a further example method, the optical paint 120 may be painted onto the individual extraction facets 14a. This example may first entail creation of the extraction facets 14a created on the surfaces 30, 32 of the waveguide(s) 100, followed by application of the optical paint 120 on individual facets. Due to limitations of TIR conditions for particular waveguides/waveguide configurations having specific slope conditions, downlight produced by TIR may be only partially available. The downlight/uplight lumen ratio and light distribution may be sensitive to the ratio of painted area/zones to non-painted area/zones as well as to the geometrical properties of the extraction facets 14a. The facets 14a are configured to extract light rays partially downward, and the pattern of the optical paint 120 painted/ applied thereon may be varied according to differing shapes of extraction facets. Additionally, different surfaces of the extraction facets may be painted and/or left unpainted to customize the light distribution developed.

Referring now to FIG. 20, an example embodiment of the waveguide 100 comprising a predesigned reflective sheet 128 is disposed over extraction facets 14b. Each of the extraction facets 14b comprise three surfaces 38b, 40b, 42b. In this example embodiment, the intermediate surface 40b extends from the first surface 38b to the second surface 42b, as previously discussed with respective to the extraction facets 14a. The intermediate surface 40b of the extraction facets 14v shown in FIG. 20 is arcuate and may comprise a quarter-pipe shape.

FIG. 20 illustrates three incident light groups (I, II, III) and three surfaces 38b, 40b, 42b of the extraction facets 14b. The light ray groups (I, II, III) are illustrated as travelling through, and the extraction facets 14b are disposed on, the angled sides 20, 22 of the waveguide 100 shown in FIGS. 2A, 3, and 4. Light ray group (I) travels to the first, slanted surface 38b first and is reflected specularly in a downward direction by TIR. The concave intermediate facet surface 40b enables reflected rays to travel in varied V-angles by specular reflection or TIR.

The light ray group (II) hits the intermediate surface 40b and passes through the upper surface 30 of the waveguide body 12. The reflective sheet 128 is disposed over the extraction facets 14b and comprises a smaller incident angle than the critical angle (e.g. about 42°). The light ray group (II) is reflected diffusely by the reflective sheet 128 in a downward direction returning through the upper surface 30 and then refracting out of the bottom surface 32.

The light ray group (III) strikes the second surface 42b and is reflected specularly by TIR. The light ray group (III) is thereby guided within the waveguide body 12 through multi-reflection.

In the three detailed light ray options discussed hereinabove, light rays with larger incident angles than the critical angle at each of the surfaces 38b, 40b, 42b may be guided within the waveguide body 12 until striking another surface at an incident angle that is less than the critical angle at such another surface.

This feature may improve optical efficiency as compared with embodiments utilizing only the optical paint 120 because the possibility of absorption of light by the optical paint 120 may be reduced.

Figure 21:
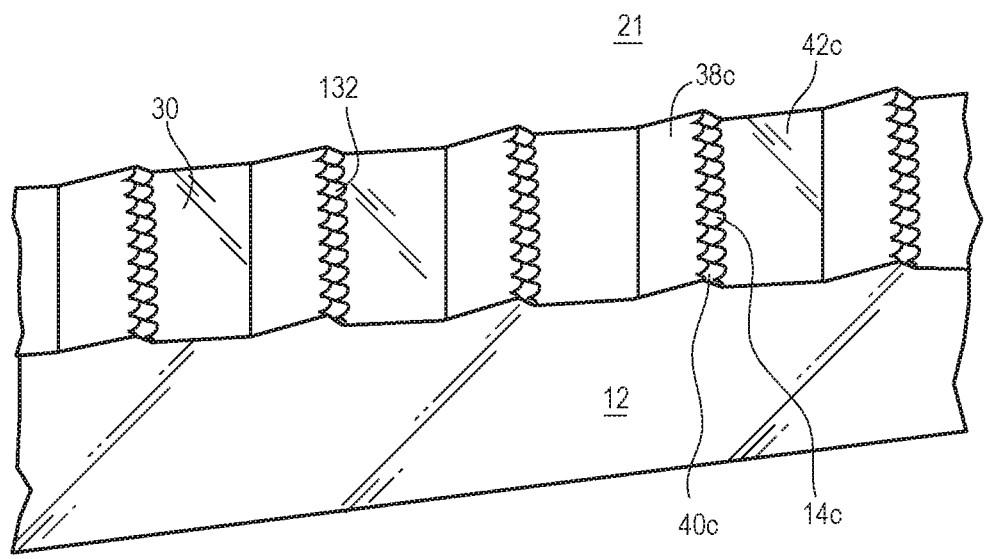
FIG. 21 is an isometric view from above of the extraction features of FIG. 20 comprising cylindrical prisms thereon.

FIG. 21 depicts a further example of extraction facets 14c. In this example embodiment, the intermediate surfaces 40c (between first and second surfaces 38c, 42c) are scalloped and/or fish-scaled to define cylindrical prisms 132 disposed thereon, as shown. These extraction facets 14c may be spaced apart about 4.0 mm and each scallop 14c may have a radius of curvature of about 0.5 mm. In such an example embodiment comprising the fish-scaled extraction facets 14c the lumens ratio of downlight/uplight may be simulated as about 77/23 with an optical efficiency of about 82%.

Figure 22:
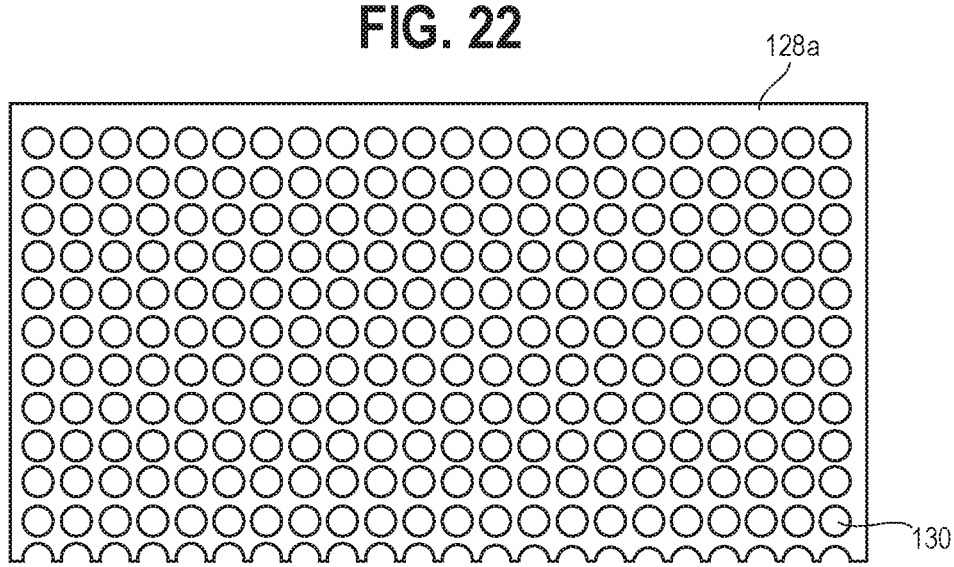
FIGS. 22-24 are plan views of reflective sheets for placement on a surface of the waveguide, according to example embodiments.
Figure 23:
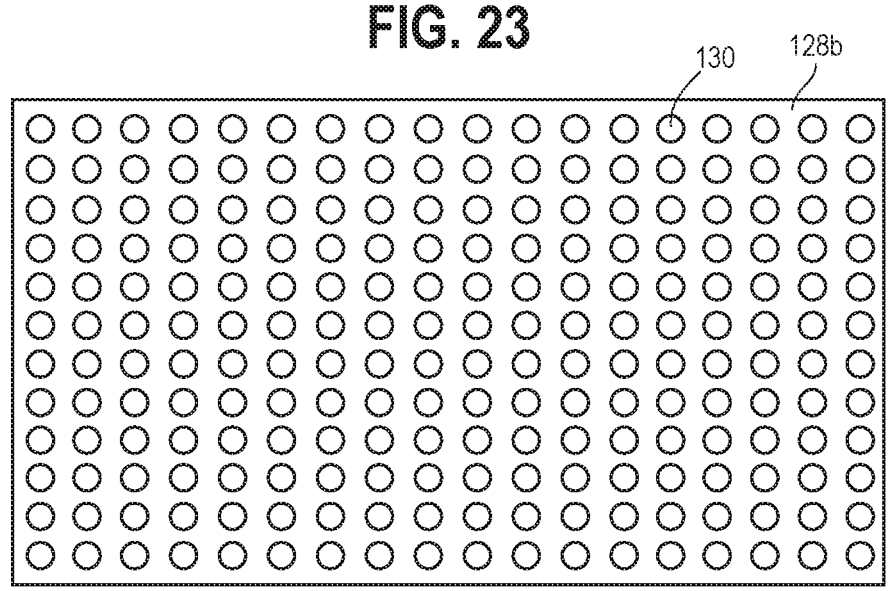
Figure 24:
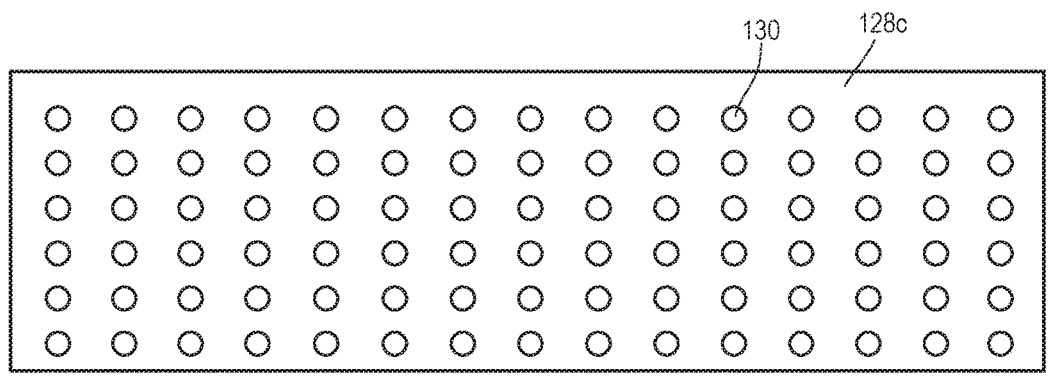
Figure 24A:
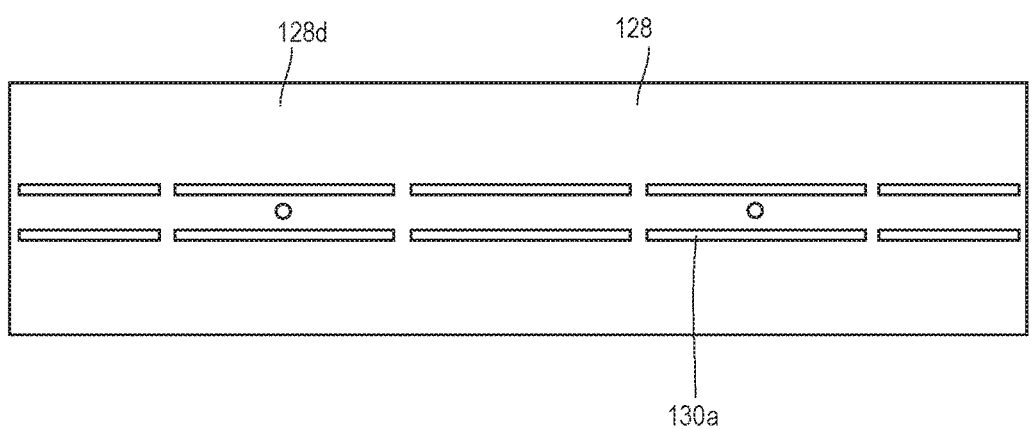
FIG. 24A is a plan view of another reflective sheet for placement on a surface of the waveguide, according to an example embodiment.
Figure 24B:
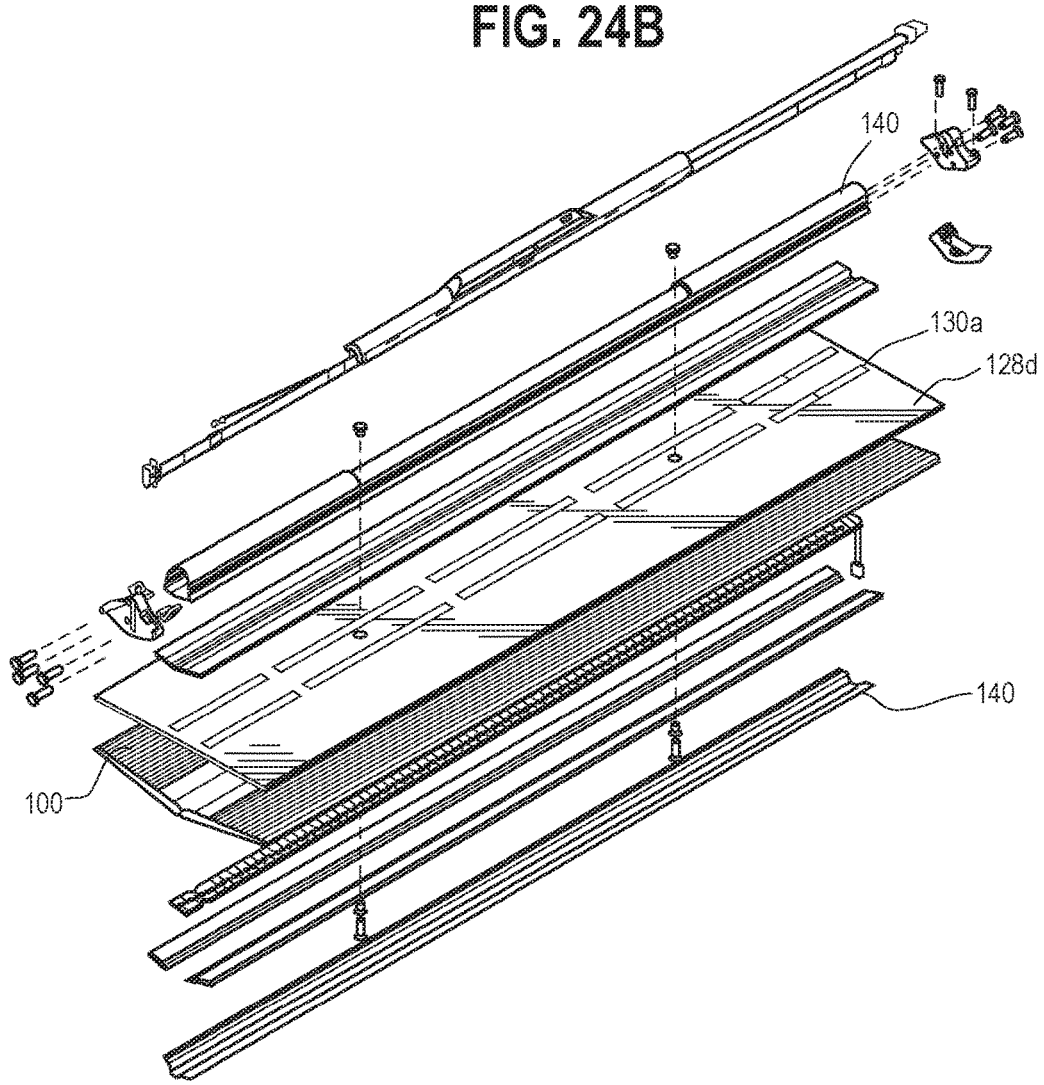
FIG. 24B is an exploded isometric view of a luminaire of the present disclosure, according to an example embodiment.
Figure 25:
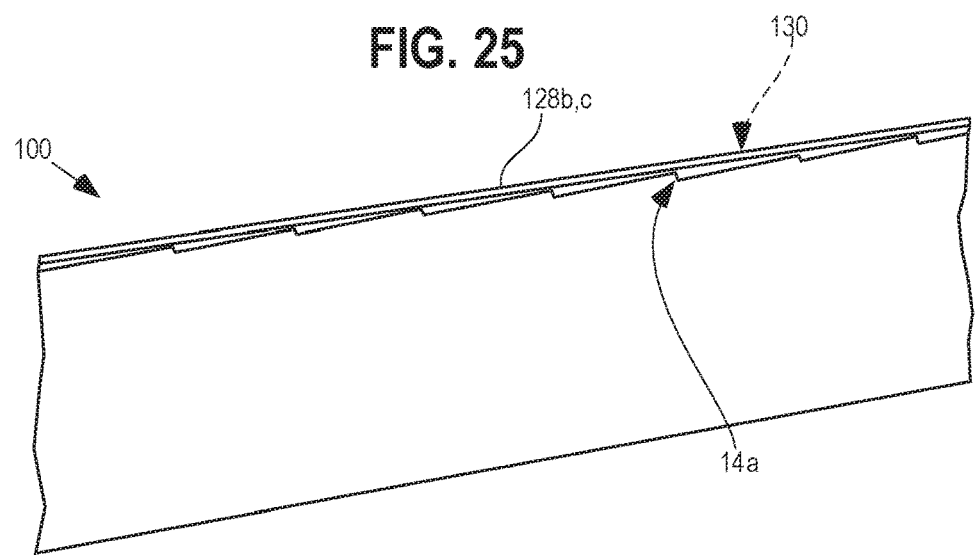
FIG. 25 is a side elevational view of a reflective sheet disposed on a surface of the waveguide, according to an example embodiment.

FIGS. 22, 23, and 24 illustrated example embodiments of the predesigned reflective sheet 128. FIG. 22 depicts a 50% coverage selection of a reflective sheet 128a. FIG. 23 depicts a 77% coverage selection of a reflective sheet 128b. FIG. 24 depicts an 85% coverage selection of a reflective sheet 128c. Each of the sheets comprises holes 130 and/or otherwise suitable gaps disposed therethrough. The holes/gaps 130 may, but need not, be uniform in size, shape, and/or distribution, and, instead, may be randomly arranged. The sheets depicted in FIGS. 22-24 may be pre-fabricated and/or customized WhiteOptics® Reflectors Film or WhiteOptics® Advanced Coatings. The 77% and 85% coverage reflective sheet(s) 128 of FIGS. 23 and 24, respectively, may also comprise Makrolon® 6487 Polycarbonate manufactured by Covestro Plastics. FIG. 24A depicts another example embodiment of a reflective sheet 128d. In this example of the reflective sheet 128d, elongate holes/openings 130a are disposed proximal an interior of the sheet 128. When the reflective sheet 128d is arranged on the upper surface 30 of the waveguide 100, as illustrated in the exploded view of the luminaire 10 of FIG. 24B, the elongate holes/openings 130a are disposed proximal the first ends 20b, 22b of the respective sides 20, 22 of the waveguide body 12 proximal to the coupling portion 24 thereof. The elongate holes/openings 130a allow a portion of light rays to escape upwards from the upper surface 30 of the waveguide 100. The reflective sheet 128d may be predesigned to fit the shape of a desired luminaire. Light may leak through the reflective sheet 128d, as well as out of the edges of the waveguide 100, allowing some uplight distribution. Further, light leakage through the reflective sheet 128d may provide for a "glow"-type effect that is desirable for particular applications. Referring to FIG. 25, the reflective sheet(s) 128b providing 77% coverage (FIG. 23) are disposed over the extraction facets 14a having the shape, distribution, and relative sizes of the extraction features 14a shown in previous embodiments of FIGS. 5 and 6. The holes 130 disposed through the reflective sheet(s) 128b may comprise diameters of 3.0 mm and be spaced apart 6.2 mm by 5.0 mm. In example embodiments comprising the reflective sheet(s) 128b of FIG. 23, the lumens ratio of downlight/uplight is simulated as about 67/33 with an optical efficiency of about 83.0%. In another example embodiment, the reflective sheet(s) 128c disposed over the extraction facets 14a, such as are shown in FIGS. 5 and 6, provides 85% coverage (FIG. 24). The holes 130 disposed through the reflective sheet(s) 128c providing 85% coverage comprise diameters of 2.66 mm and are spaced apart 7.286 mm by 5.0 mm. In example embodiments comprising the reflective sheet(s) 128c of FIG. 24, the lumens ratio of downlight/uplight is simulated as about 70.0/30.0 with an optical efficiency of about 83%. In example embodiments comprising the 85% coverage reflective sheet(s) 128c of FIG. 24 with a different reflectiveness (such as Makrolon 6487®), the lumens ratio of downlight/uplight may be simulated as about 70/30 with an optical efficiency of about 83%.

Figure 26:
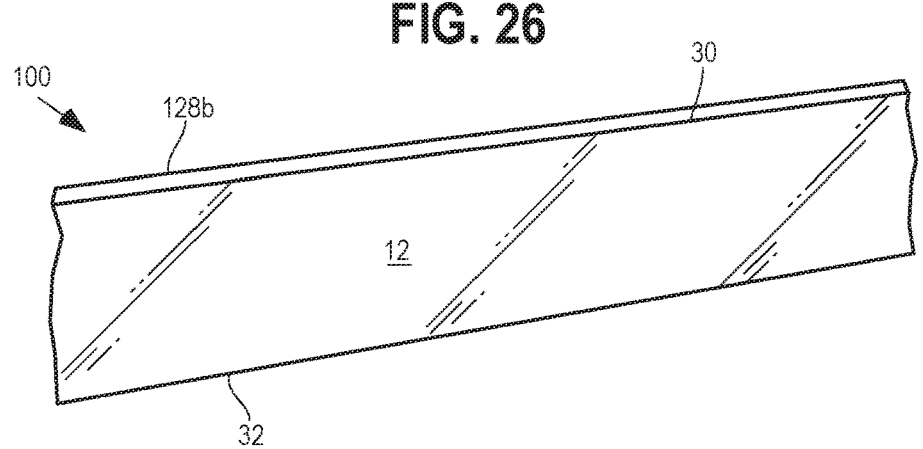
FIG. 26 is a side elevational view of a reflective sheet disposed on a surface of the waveguide, according to an example embodiment.
Figure 39:
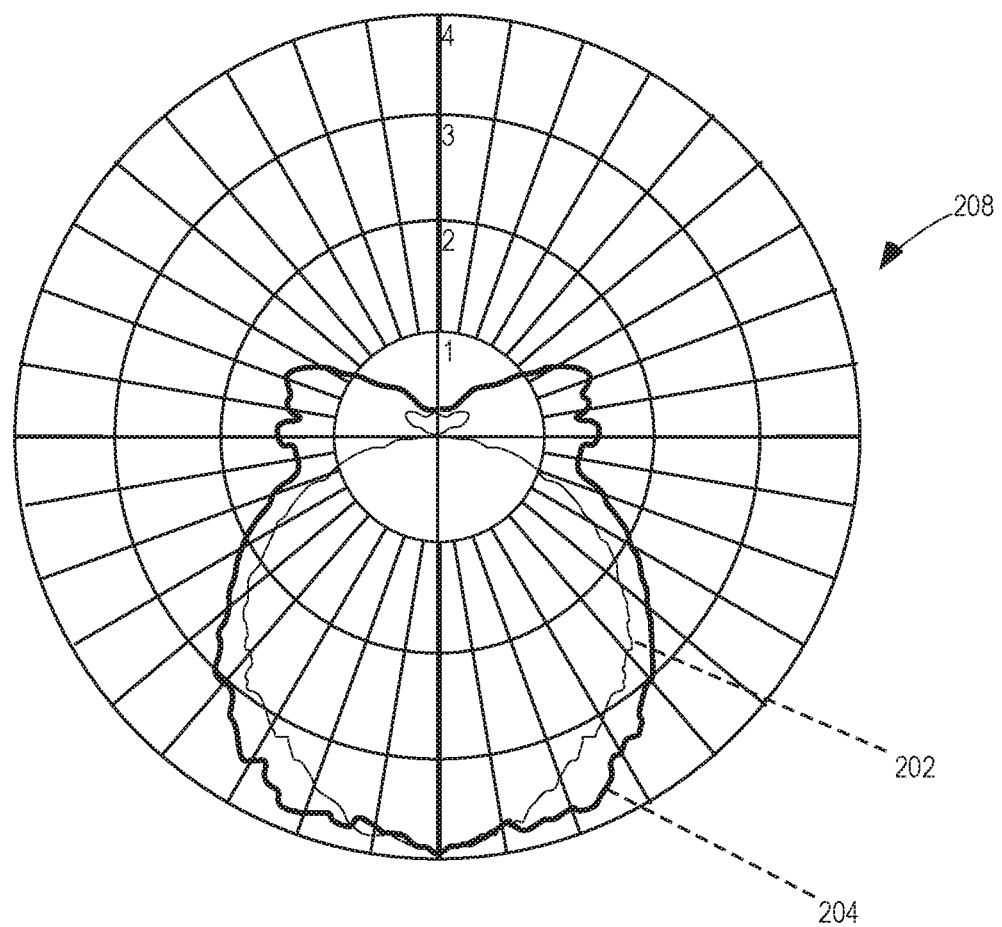

In FIG. 26, an embodiment of the waveguide 100 is illustrated without extraction facets and covered by the reflective sheet(s) 128b of FIG. 23 comprising 77% coverage. In this example embodiment comprising the reflective sheet(s) 128b of FIG. 23 and omitting extraction facets, the lumens ratio of downlight/uplight may be simulated as about 56.0/44.0 with an optical efficiency of about 85%. FIG. 39 depicts an intensity distribution 208 that may be produced by the luminaire 10 with the reflective sheet 128d, shown in FIGS. 24A and 24B, disposed on the upper surface 30 of the waveguide 100. The intensity distribution 208 illustrates light 202 distributed along the waveguide axis L (FIG. 2A) and light 204 distributed transverse to the axis and along the waveguide width W. The example intensity distribution 208 of FIG. 39 illustrates a lumen ratio of downlight/uplight of about 79/21 and approximates an intensity achieved with the reflective sheet 128d disposed on the waveguide sides/wings 20, 22. The intensity distribution 208 of FIG. 39 comprises a desirable Lambertian distribution in the downlight.

Figure 27:
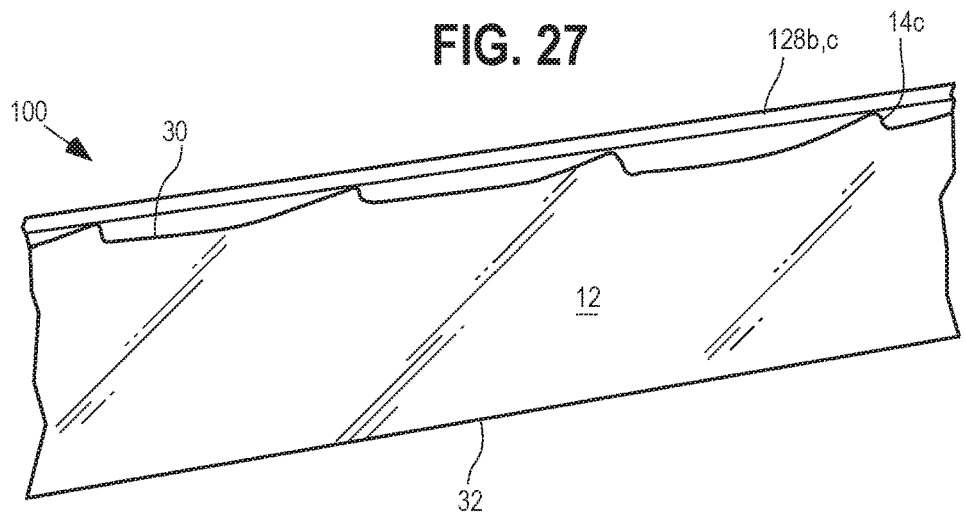
FIG. 27 is a side elevational view of a reflective sheet disposed on a surface of the waveguide, according to an example embodiment.

Referring now to FIG. 27, an embodiment of the waveguide 100 is illustrated with the reflective sheet(s) 128b disposed thereon providing 77% coverage. In this example the extraction facets 14b are disposed on the upper surface 30 of the waveguide body 12 with the 77% coverage reflective sheets, in turn, disposed thereon. The extraction facets 14b may be spaced about 4.0 mm with an arc length of 0.3 mm. In this example embodiment comprising the reflective sheet(s) 128b of FIG. 23 providing 77% coverage disposed over the extraction facets 14b, the lumens ratio of downlight/uplight may be simulated as about 74/26 with an optical efficiency of about 84%.

In another example embodiment comprising the reflective sheet(s) 128b of FIG. 24 providing 85% coverage disposed over the extraction facets 14b, the lumens ratio of downlight/uplight may be simulated as about 77/23 with an optical efficiency of about 84%. In still another example embodiment comprising the 85% coverage reflective sheet(s) 128c of FIG. 24 with a different reflectiveness (such as Makrolon 6487®) disposed over the extraction facets 14b, the lumens ratio of downlight/uplight may be simulated as about 78/22 with an optical efficiency of about 85%.

According to another aspect of this disclosure the reflective paper/sheet(s) 128 provide an additional feature for developing desired illumination distribution patterns. The reflective sheet(s) 128 may be designed separately and then added to, combined with, and/or cover the sides 20, 22 of a waveguide to develop diffuse reflection in a generally downward direction. The extraction facets 14a, 14b, 14c disposed on one more of the surfaces 30, 32 of the waveguide 100 may also be designed separately to extract upward or downward independently, and then combined with one or more of the predesigned reflective sheet(s) 128. The extraction facets 14c may comprise cylindrical prisms 132, facet curvature(s), and/or extra fishscales disposed thereon in order to achieve uniform or substantially uniform distribution. The reflective sheet(s) 128 may be combined or over-molded with/onto the waveguide(s) 100. The combination of the reflective sheet(s) 128 with the extraction facets 14a, 14b, 14c may enable efficient construction of a target light ray distribution.

The combination with and/or over-molding of the reflective sheet(s) 128 with/onto extraction facets of the waveguide(s) may result in small air gaps between the reflective sheet(s) 128 and the extraction facets 14a, 14b, 14c. However, this combination may provide increased optical efficiency, as compared with directly painting reflective material thereon, by utilizing both TIR and regular reflection characteristics. It is notable that TIR may result in almost 100% reflection while reflection by the reflective sheet(s) 128 may develop some optical loss/decreased efficiency as a result of absorption by the reflective sheet(s) 128.

Further, the extraction facets 14a, 14b, 14c enable light rays to be extracted generally downward toward a floor directly by TIR as well as by reflection off of the reflective sheet(s) 128. The outgoing rays at wide angles are reflected diffusely by the reflective sheet(s) 128 and are directed downward after passing through the waveguide body 12 once again. A specific light distribution may be selected/customized by adjusting the extraction facet 14a, 14b, 14c angles while combining such adjustment with different coverage and/or throughhole/shape embodiments of the reflective sheet(s) 128 on the upper surface(s) 30 of the waveguide sides 20, 22.

The combination of the reflective sheet(s) 128 and extraction facets 14a, 14c also enables light distribution patterns to efficiently generate desired specific shapes such as Lambertian, wide, and/or narrow distributions. Still further, as described with reference to FIG. 21, individual extraction facets may comprises arrays of the cylindrical prisms 132 disposed thereon and formed of the same material as the waveguide body 12. The cylindrical prisms 132 enable the utilization of TIR by a portion of light rays at a larger angle than what would otherwise be the critical angle of the materials without the cylindrical prism feature 132. The prisms may provide for a critical angle of about 42 degrees for acrylic material. Light rays striking the prism surface(s) at a smaller angle than the critical angle pass through the facets 14c and travel outward from the waveguide body 12

(through the upper surface 30 thereof) until reflected by the reflective sheet(s) 128 or allowed to pass through the holes 130.

Figure 28:
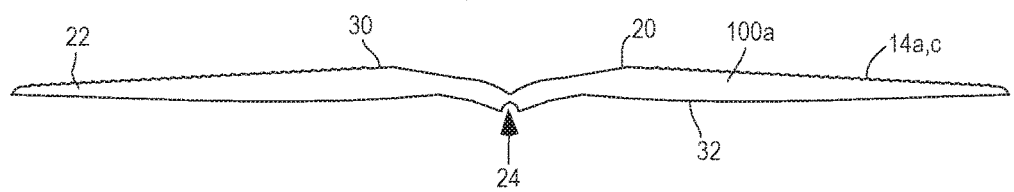
FIG. 28 is a side elevational view of a waveguide having extraction features disposed thereon, according to an example embodiment.

Referring now to FIG. 28, the sides 20, 22 of the waveguide body 12 may be further modified while maintaining the coupling portion/cavity 24 and the light source 25 arrangement thereof.

Both a shape and angle of the sides 20, 22 may be modified to produce desirable light distributions. The taper and/or thickness along the sides 20, 22 may be modified in example embodiments. Also, in embodiments, the lower surface 32 of the waveguide 100 may be flattened and/or curved in accordance with achieving desirable light distributions. The extraction facets 14a, 14b 14c disclosed hereinabove may be included, alone or combined, on one or both of the upper and lower surfaces 30, 32 of the waveguide body 12. This embodiment may provide increases in optical efficiency because TIR may decrease absorption of light (such as may occur with reflective materials), thereby developing a desirable light distribution with relatively high optical efficiency. However, the present disclosure also contemplates combinations of the structural modifications of the waveguide sides 20, 22 detailed hereinbelow, with the optical paint(s) 120 and/or the reflective sheet(s) 128 disclosed hereinabove. The addition or subtraction of the individual cylindrical prisms 132 may provide for customizable color mixing qualities. Generally, a greater number of the cylindrical prisms 132 provides more uniform distribution of light in a downward direction. The example embodiments of the waveguide 100 illustrated in FIGS. 28-31 do not have extraction facets disposed on the lower surface(s) 32 thereof.

Referring now to FIG. 31, extraction facets 14b are shown on an example embodiment of the waveguide disposed horizontally. Each of the extraction facets 14b have the three surfaces 38b, 40b, 42b, as discussed hereinabove. The angles developed when the extraction facets 14b are disposed on horizontal sides 20, 22 of embodiments of the waveguide 100 make incident most of the light rays (L2) with relatively slow or large angles produced by a transfer portion (TP) of each of the sides 20, 22 and then traversing said sides 20, 22 thereafter. The relatively low incident-angle rays may be reflected on concave facet surfaces 40b in various directions and downward. Other rays may be guided within the waveguide body 12 due to the low incident angle of the rays and may be reflected by subsequently disposed facet surfaces sequentially moving towards the end of each of the sides 20, 22. Additionally, embodiments may include the extraction facets 14c comprising cylindrical prisms 132 disposed along the concave intermediate surfaces 40c may improve uniformity of the downlight distribution to meet desirable and/or selected specifications.

Figure 29:
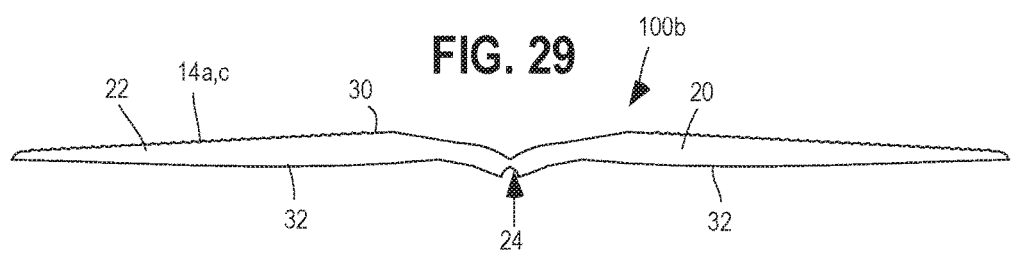
FIG. 29 is a side elevational view of a waveguide having extraction features disposed thereon, according to an example embodiment.
Figure 30:
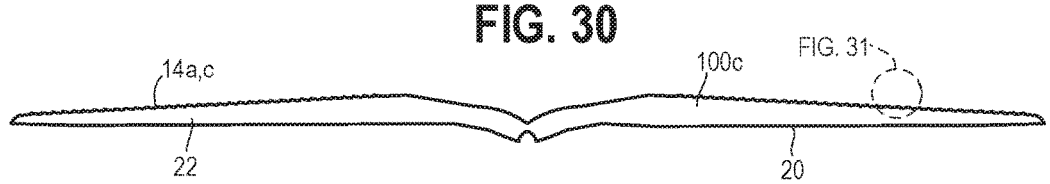
FIG. 30 is a side elevational view of a waveguide having extraction features disposed thereon, according to an example embodiment.
Figure 38:
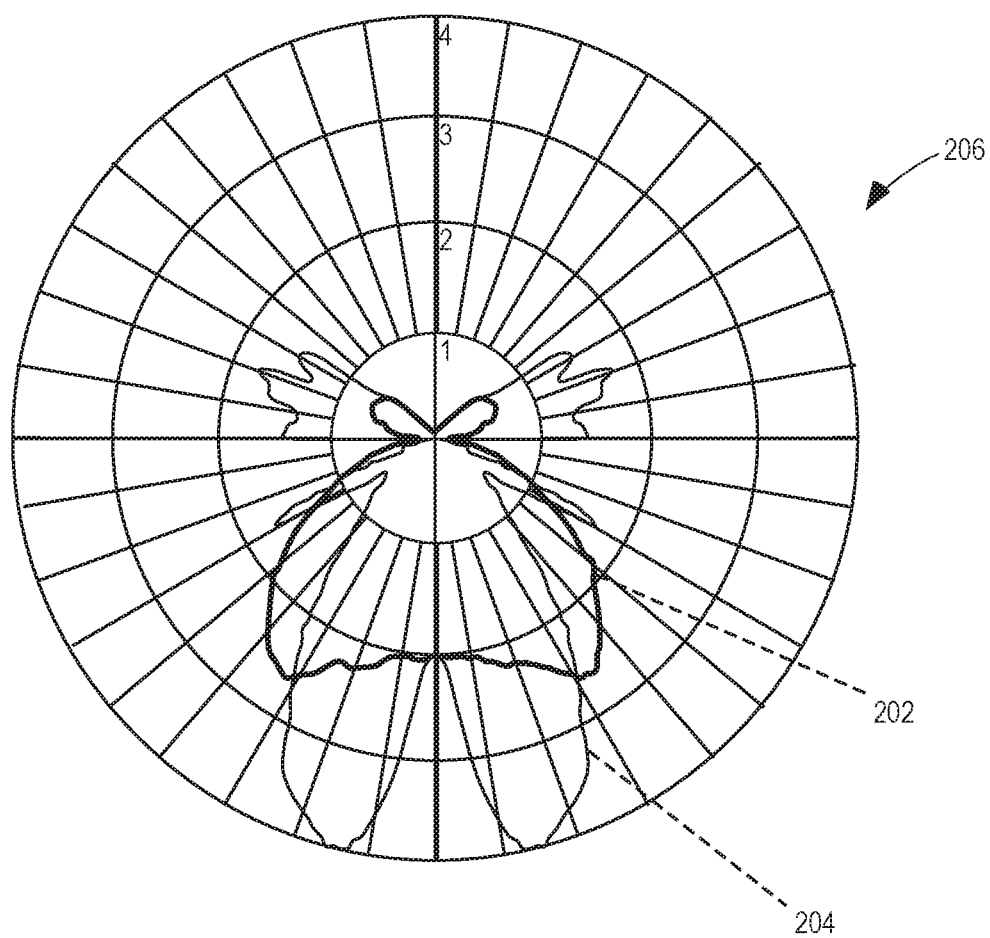

Referring back to FIGS. 28-30, examples embodiments of planar/horizontal waveguides 100a, 100b, 100c are depicted with horizontally disposed sides 20, 22. These flat waveguides 100b, 100c, 100d comprise the extraction facets 14b, 14c of FIG. 31 on tapered portions 134a, 134b, 134c, of the upper surfaces 30 thereof. In FIG. 28, the lower surfaces 32 of the waveguide 100a are parallel and on the same plane as one another. In FIG. 29, the lower surfaces 32 of the waveguide 100b are convex/curved outward. In FIG. 30, the waveguide 100c comprises the extraction facets 14a with the cylindrical prisms 132, shown enlarged in FIG. 32, on the tapered portions 134c thereof. The lower surfaces 32 of the sides 20, 22 of the waveguide 100c are convex/curved (similar to the lower surfaces 32 of FIG. 29). The waveguides 100a, 100b, 100c may achieve lumen ratios of downlight/uplight of about 78/22; 78/22; and 74/26, respectively. FIG. 38 depicts an intensity distribution 206 that may be produced by the waveguide 100c with features shown in FIG. 32. The intensity distribution 206 illustrates light 202 distributed along the waveguide axis L (FIG. 2A) and light 204 distributed transverse to the axis and along the waveguide width W. The example intensity distribution 206 of FIG. 38 illustrates a lumen ratio of downlight/uplight of about 70/30 and approximates an intensity achieved with the facets 14a and the cylindrical prisms 132 on horizontal waveguide sides/wings 20, 22. The intensity distribution 206 comprises a batwing-shaped downlight distribution.

Also, in example embodiments, the waveguide 100a may comprise the top facets 14c and the cylindrical prisms 132 of FIG. 21. This example may achieve lumen ratios of downlight/uplight of about 70/30 to 68/32 depending on the size and space spacing of the cylindrical prisms 132.

In further example embodiments, the waveguide 100b may comprise the top facets 14c and the cylindrical prisms 132 of FIG. 21 to achieve lumen ratios of downlight/uplight of about 71/29.

Figure 33:
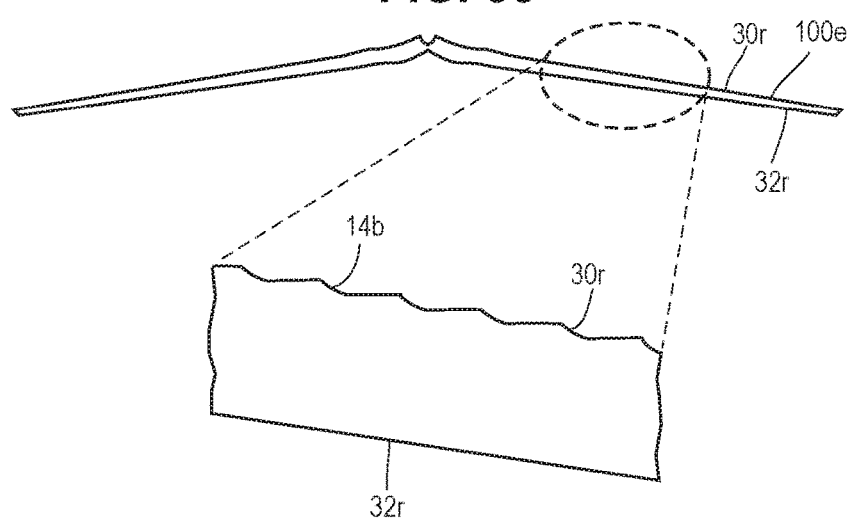
FIG. 33 is a side elevational view of a waveguide and an enlarged view of extraction features disposed on a surface thereof, according to an example embodiment.
Figure 34:
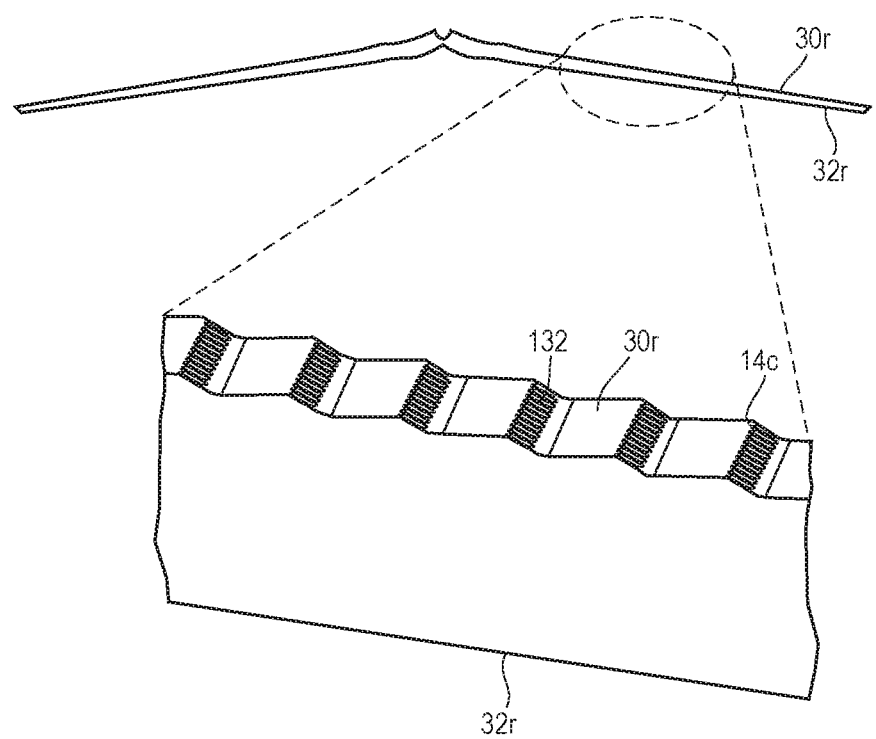
FIG. 34 is a side elevational view of a waveguide and an enlarged view of extraction features disposed on a surface thereof, according to an example embodiment.

Referring now to FIGS. 33 and 34, waveguides 100e, 100f comprise an upside-down orientation as compared with the waveguide 100 of FIG. 4. The upper and lower surfaces 30, 32 are, therefore, reversed relative the coupling portion/cavity 24 and are referred to as 30r, 32r in the reversed state.

The waveguide 100e of FIG. 33 comprises the curved extraction facets of FIG. 20 on the upper surface 30r. This example embodiment of the waveguide 100e may achieve a lumen ratio of downlight/uplight of about 71/29 and an optical efficiency of about 84%.

The waveguide 100f of FIG. 34 comprises the curved extraction facet 14c with the cylindrical prisms 132 of FIG. 21 on the upper surface 30r thereof to achieve a lumen ratio of downlight/uplight of about 69/31 and an optical efficiency of about 84%.

Referring now to FIGS. 35 and 36, the waveguides 100g, 100h, as illustrated, comprise one or more bends 140 in the sides 20, 22 thereof. The waveguide 100g of FIG. 35 comprises the sides 20, 22 bent back towards the coupling portion 24 and the extraction facets 14b of FIG. 20 disposed on the upper surfaces 30 thereof. The sides 20, 22 comprise a relatively even thickness 136 for an extent 138 thereof. This example may achieve a lumens ratio of downlight/uplight of about 65/35

The sides 20, 22 of the waveguide 100h, depicted in FIG. 36, are bent back towards the coupling portion 24, but a taper of each of the sides 20, 22 begins from a first, larger thickness 148 (as compared with the even thickness 136 of the waveguide 100g) and tapers towards the ends 20A, 22A thereof. Each of the sides 20, 22 bends toward the coupling portion 24 at a first point 136 of the bottom surface 32. The extraction features 14b disposed on the upper surface 30 may be separated into first and second pluralities with a separation surface 146 therebetween. The waveguide 100h of FIG. 36, with the extraction facets 14c disposed thereon, may achieve a lumens ratio of downlight/uplight of about 71/29. In another example embodiment, the waveguide 100h of FIG. 36 may comprise the extraction facets 14c and the cylindrical prisms 132 disposed thereon. For this embodiment, the waveguide 100h may achieve a lumens ratio of downlight/uplight of about 67/33.

INDUSTRIAL APPLICABILITY

Contemplated embodiments of the waveguide(s) 100 changing and/or modifying the shape of one or more sides/ wings of the waveguide(s) 100 to include horizontal, angled, or curved shapes and/or surfaces. In such example embodiments, the optical paint 120 and/or the reflective sheet(s) 128 may or may not be included because the target light distribution and/or illumination pattern may be developed by the shape and pattern of the one or more sides 20, 22 of the waveguide(s) 100 in combination with extraction facets having similarly modifiable shapes and/or patterns. The cylindrical prisms 32 on the upper surface 30 of an example waveguide assist in the control of light rays to be extracted downward according to the target light distribution. The section profile of example prism facets may be a concave shape such that light rays are reflected according to TIR with varied angles in generally downward direction(s). For example, incident light rays from a linearly arrayed LED light source may travel through the waveguide to extraction facets and main beam rays may be reflected on the facet surface by TIR while some further rays pass through said facet surface. This example embodiment may provide aesthetic benefit when a transparent fixture waveguide is utilized because the extraction facets of such waveguide(s) are composed of the same or similar transparent material(s).

According to this embodiment, the wing(s) of the waveguide(s) may have a different slope and dimensions while retaining the coupling geometry, assembly arrangement, and mounting configuration of the luminaire 10 shown in FIG. 4.

There are at least three example methods/embodiments of modifying the solid shape of one or more wings of the waveguide(s) in order to produce the target light distribution. In a first example, the waveguide(s) are modified to slope horizontal to the ground/floor/surface to be illuminated and extraction facets are disposed on the horizontal wings thereof. This embodiment may provide relatively high optical efficiency of about 88%. This horizontal configuration of the one or more wings of the waveguide in combination with extraction facets develops good light distribution with a lumens ratio of 70/30 and Lambertian downlight and/or narrow downlight, as desired for any particular lighting application.

Turning to aspects of the extraction facets, a cylindrical prism array of extraction facets may be created on the upper surfaces of waveguide(s). The prism section profile comprises a concave shape for each prism so that varied light rays are reflected on the concave surface and such reflected light rays are directed downward in different directions and/or at different angles to form a smooth light distribution as opposed sharp, glaring light. Incident light rays guided by the waveguide body from a linearly arrayed LED source travel to the extraction facet(s) and main beam rays may be reflected on the surfaces of the extraction facets by TIR while some of such rays pass through the facet surface. Beam angle along the fixture-crossed direction may be controlled by configuring facet uniformity. For example, all the facet surfaces may be substantially the same and therefore may together develop a narrow or wide beam by adjusting the facet(s) angle uniformity. In a further example embodiment, all facet surfaces may be substantially the same and adjusted according to a uniform modification in order to develop a narrow or wide beam. In a still further embodiment, all facet surfaces may be substantially the same but the respective angles thereof may vary according to distance from the light source or according to another pattern in order to develop a relatively narrower, relatively wider, or relative uniform illumination pattern/beam.

According to another method/embodiment one or more wings/sides of the waveguide 100 may be modified to form a curved and/or angled solid shape. On the curved or angled waveguide(s) wing, extraction facets may be arranged to develop the target light distribution and/or illumination pattern for any particular application.

According to yet another method/embodiment the current waveguide having one or more wings, in accordance with the housing 102 of FIG. 4, in a solid configuration may be utilized upside-down. For this method/embodiment, current extraction facets are removed from the former upper surface of the waveguide, now facing downward, and alternative extraction facets are arranged on the former bottom surface of the waveguide, now facing upward, and such extraction facets are configured to meet the target light distribution.

Generally, it may be desirable for luminaires of the LN4-type or LN series to produce the target light distribution of Lambertian downward, towards a floor, and small batwing shape upward, towards a ceiling, with a lumens ratio of 70/30 for downlight/uplight distribution. The waveguide(s) described hereinabove enables luminaires to generate the Lambertian and lumens ratio 70/30 downlight/uplight distribution in conjunction with use of existing LN4 mounting assemblies, including the heatsink, LEDs, PCB, suspension, and end cap(s) configurations thereof.

The methods/embodiments described herein may be applied to other luminaries utilizing other waveguides (than those luminaires and waveguides pictured) without substantially altering the principles set forth hereinthroughout.

In at least some of the present embodiments, the distribution and direction of light within the waveguide is better known, and hence, light is controlled and extracted in a more controlled fashion. In standard optical waveguides, light bounces back and forth through the waveguide. In the present embodiments, light is extracted as much as possible over one pass through the waveguide to minimize losses.

In some embodiments, one may wish to control the light rays such that at least some of the rays are collimated, but in the same or other embodiments, one may also wish to control other or all of the light rays to increase the angular dispersion thereof so that such light is not collimated. In some embodiments, one might wish to collimate to narrow ranges, while in other cases, one might wish to undertake the opposite.

As in the present embodiments, a waveguide may include various combinations of mixing features, extraction features, and redirection features necessary to produce a desired light distribution. A lighting system may be designed without constraint due to color mixing requirements, the need for uniformity of color and brightness, and other limits that might otherwise result from the use of a specific light source. Further, the light transport aspect of a waveguide allows for the use of various form factors, sizes, materials, and other design choices. The design options for a lighting system utilizing a waveguide as described herein are not limited to any specific application and/or a specific light source.

All references, including publications, patent applications, and patents, cited herein are hereby incorporated by reference to the same extent as if each reference were individually and specifically indicated to be incorporated by reference and were set forth in its entirety herein.

The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The disclosed systems and methods are well adapted to attain the ends and advantages mentioned as well as those that are inherent therein. The particular implementations disclosed above are illustrative only, as the teachings of the present disclosure may be modified and practiced in different but equivalent manners apparent to those skilled in the art having the benefit of the teachings herein. It is therefore evident that the particular illustrative implementations disclosed above may be altered, combined, or modified and all such variations are considered within the scope of the present disclosure. The systems and methods illustratively disclosed herein may suitably be practiced in the absence of any element that is not specifically disclosed herein and/or any optional element disclosed herein. All numbers and ranges disclosed above may vary by some amount. Whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the element that it introduces. If there is any conflict in the usages of a word or term in this specification and one or more patent or other documents that may be incorporated herein by reference, the definitions that are consistent with this specification should be adopted.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

In one aspect, a term coupled or the like may refer to being directly coupled. In another aspect, a term coupled or the like may refer to being indirectly coupled. Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The use of the terms "a" and "an" and "the" and similar references in the context of the present disclosure (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:

1. A waveguide assembly comprising:
   a waveguide body comprising an optically transmissive material, the waveguide body being partially defined by a first surface and a second surface opposed to the first surface, where light primarily exits the waveguide body from the second surface;
   a light source directing light into the waveguide body through a coupling cavity extending along the waveguide body; and
   one or more extraction features disposed on the first surface of the waveguide body for reflecting the light to the second surface of the waveguide body, a reflective material disposed on at least a first portion of the first surface of the waveguide body such that first areas of the first surface of the waveguide body are covered by the reflective material and second areas of the first surface of the waveguide body are uncovered by the reflective material, a first portion of the light passing through the first surface of the waveguide body in the second areas and a second portion of the light being reflected by total internal reflection in the second areas back into the waveguide body.

2. The waveguide assembly of claim 1 wherein the reflective material comprises discrete portions of reflective material disposed on the first surface of the waveguide body.

3. The waveguide assembly of claim 2 wherein the discrete portions of reflective material comprise arcuate boundaries.

4. The waveguide assembly of claim 3 wherein the discrete portions of reflective material comprise circles of reflective material.

5. The waveguide assembly of claim 4 wherein the circles of reflective material are disposed in one or more arrays on the first surface of the waveguide body.

6. The waveguide assembly of claim 2 wherein the discrete portions of reflective material comprise strips of material extending substantially parallel to the coupling cavity.

7. The waveguide assembly of claim 6 wherein the discrete portions of reflective material comprise strips of material having arcuate boundaries.

8. The waveguide assembly of claim 2 wherein the discrete portions of reflective material comprise a Lambertian paint.

9. The waveguide assembly of claim 8 wherein the one or more extraction features further comprises a concave redirection surface.

10. The waveguide assembly of claim 9 wherein the reflective material is disposed along the concave redirection surface of the one or more extraction features.

11. The waveguide assembly of claim 9 wherein the reflective material is painted on the concave redirection surface of the one or more extraction features.

12. The waveguide assembly of claim 1 wherein the one or more extraction features further comprises a ridge.

13. A lighting system comprising:
a waveguide comprising an elongate coupling cavity, at least one first surface, and at least one second surface;
a light source emitting light into the waveguide through the elongate coupling cavity;
a plurality of extraction features disposed on the at least one first surface for emitting light out of the waveguide primarily through the at least one second surface; and,
a reflective material disposed over the at least one first surface such that the at least one first surface comprises first areas covered by the reflective material and second areas uncovered by the reflective material where in the second areas a first portion of the light passes through the at least one first surface and exits the waveguide and a second portion of the light is reflected by total internal reflection back into the waveguide, wherein the plurality of extraction features and the reflective material operate together to develop a light distribution.

14. The lighting system of claim 13 wherein the plurality of extraction features comprise one or more ridges.

15. The lighting system of claim 14 wherein the plurality of extraction features further comprise a plurality of concave surfaces, wherein each of the plurality of extraction features comprise at least one of the plurality of concave surfaces adjacent each of the one or more ridges.

16. The lighting system of claim 15 wherein the plurality of concave surfaces extract light out of the waveguide.

17. The lighting system of claim 16 wherein the plurality of concave surfaces reflect light towards the at least one second surface by total internal reflection.

18. The lighting system of claim 15 wherein the reflective material comprises a sheet of reflective material disposed over the at least one first surface.

19. The lighting system of claim 18 wherein air gaps are disposed between the plurality of concave surfaces and the sheet of reflective material.

20. The lighting system of claim 19 wherein the plurality of extraction features redirect light out of the waveguide through the at least one second surface.

21. The lighting system of claim 20 wherein the reflective material redirects light into the waveguide and out of the at least one second surface.

22. A waveguide assembly comprising:
an optically transmissive waveguide body comprising first and second coupling surfaces and a first side section and a second side section;
one or more light sources directing light into the waveguide body through the first and second coupling surfaces;
the first side section and the second side section receiving the light from the first and second coupling surfaces, respectively, and internally reflecting the light; and
the first side section comprises a first surface and the second side section comprises a second surface, a first plurality of extraction features and a second plurality of extraction features on each of the first surface and the second surface, the first plurality of extraction features being spaced from the second plurality of extraction features by a separation face where the separation face does not include extraction features, and wherein each of the first and second side sections bend towards the respective first and second coupling surfaces at respective first points thereof, the respective first points being located in the area of the separation faces.

23. The waveguide assembly of claim 22 wherein each of the first and second pluralities of extraction features are comprised of first and second extraction feature shapes.

24. The waveguide assembly of claim 23 wherein each of the first and second pluralities of extraction features comprise concave surfaces with different radii of curvature.

25. The waveguide assembly of claim 22 wherein each of the first and second side sections comprise a decreased thickness at the respective first points thereof.

26. The waveguide assembly of claim 22 further comprising one or more reflective sheets partially disposed over the first plurality of extraction features and the second plurality of extraction features.

* * * * *